(12) United States Patent
Kobayashi et al.

(10) Patent No.: US 6,989,982 B2
(45) Date of Patent: Jan. 24, 2006

(54) SOLID ELECTROLYTIC CAPACITOR, CIRCUIT BOARD HAVING BUILT-IN SOLID ELECTROLYTIC CAPACITOR AND METHODS FOR MANUFACTURING THEM

(75) Inventors: Masaaki Kobayashi, Tokyo (JP); Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/518,683

(22) PCT Filed: Jun. 18, 2003

(86) PCT No.: PCT/JP03/07733

§ 371 (c)(1),
(2), (4) Date: Dec. 17, 2004

(87) PCT Pub. No.: WO03/107367

PCT Pub. Date: Dec. 24, 2003

(65) Prior Publication Data

US 2005/0225930 A1   Oct. 13, 2005

(30) Foreign Application Priority Data

Jun. 18, 2002 (JP) .............................. 2002-177546
Jun. 18, 2002 (JP) .............................. 2002-177547

(51) Int. Cl.
*H01G 9/00* (2006.01)

(52) U.S. Cl. ...................... 361/523; 361/525; 361/528; 29/25.03

(58) Field of Classification Search ................ 361/523, 361/525–526, 527, 508, 509, 532, 528–529; 29/25.03

See application file for complete search history.

(56) References Cited

U.S. PATENT DOCUMENTS 4,097,985 A * 7/1978 Morimoto et al. ......... 29/25.03

(Continued)

FOREIGN PATENT DOCUMENTS

JP    61-15316    1/1986

(Continued)

*Primary Examiner*—Anthony Dinkins
(74) *Attorney, Agent, or Firm*—Seed IP Law Group PLLC

(57) ABSTRACT

An electrode body 100 of a solid electrolytic capacitor component includes a foil-like aluminum substrate 2 whose surface is roughened or enlarged and which is formed with an aluminum oxide film the surface thereof as an insulating oxide film, two foil-like aluminum substrates 3a,3b whose surfaces are not roughened, and two foil-like copper substrates 4a,4b as a metal electric conductor for constituting a lead electrode. On the whole surface of the foil-like aluminum substrate 2, an anode electrode 14 including a solid high molecular polymer electrolyte layer 11, a graphite paste layer 12 and a silver paste layer 13 is formed. The thus constituted solid electrolytic capacitor component 110 is accommodated in a substantially closed space defined by a first insulating substrate 21 and a second insulating substrate 22, thereby fabricating a three-terminal type solid electrolytic capacitor.

6 Claims, 16 Drawing Sheets

U.S. PATENT DOCUMENTS

| | | | |
|---|---|---|---|
| 4,831,494 A | | 5/1989 | Arnold et al. ............... 361/306 |
| 4,959,754 A | * | 9/1990 | Stufler et al. ................ 361/527 |
| 5,198,967 A | * | 3/1993 | Kuranuki et al. ........... 361/523 |
| 5,369,545 A | | 11/1994 | Bhattacharyya et al. .. 361/306.2 |
| 5,880,925 A | | 3/1999 | DuPré et al. ............... 361/303 |
| 2002/0122283 A1 | * | 9/2002 | Higashi et al. ............. 361/271 |

FOREIGN PATENT DOCUMENTS

| | | |
|---|---|---|
| JP | 62-189715 | 8/1987 |
| JP | 6-31715 | 8/1994 |
| JP | 7-27144 | 1/1995 |
| JP | 2001-307955 | 11/2001 |
| JP | 2002-313676 | 10/2002 |

* cited by examiner

SOLID ELECTROLYTIC CAPACITOR, CIRCUIT BOARD HAVING BUILT-IN SOLID ELECTROLYTIC CAPACITOR AND METHODS FOR MANUFACTURING THEM

FIELD OF THE INVENTION

The present invention relates to a solid electrolytic capacitor, a circuit board having a built-in solid electrolytic capacitor and methods for manufacturing them and, particularly, to a solid electrolytic capacitor and a circuit board having a built-in solid electrolytic capacitor constituted by forming a solid high molecular polymer electrolyte layer and a conductive layer on a foil-like valve metal substrate formed with an insulating oxide film on the surface thereof and suitable for being mounted on or built in a circuit board, and methods for manufacturing them.

DESCRIPTION OF THE PRIOR ART

An electrolytic capacitor is conventionally formed by employing a so-called valve metal capable of forming an insulating oxide film such as aluminum, titanium, brass, nickel, tantalum or the like as an anode, anodizing the surface of the valve metal to form an insulating oxide film thereon, forming an electrolyte layer substantially serving as a cathode, and forming a conductive layer of graphite, silver or the like as a cathode.

For example, an aluminum electrolytic capacitor is formed by employing as an anode a porous aluminum foil whose specific surface area is increased by etching, and providing a separation paper impregnated with an electrolytic solution between an aluminum oxide layer formed on the surface of the anode and a cathode foil.

In general, although an electrolytic capacitor using an electrolytic solution for an electrolyte layer between an insulating oxide film and a cathode has the disadvantage that its lifetime is determined by liquid leakage, evaporation of the electrolytic solution and the like, a solid electrolytic capacitor using a solid electrolyte containing metal oxide or organic compounds does not have such a disadvantage and is preferable.

Manganese dioxide is a typical metal oxide usable for the solid electrolyte of a solid electrolytic capacitor. On the other hand, as an organic compound usable for the solid electrolyte of a solid electrolytic capacitor, 7, 7, 8, 8-tetracyanoxydimenthane (TCNQ) complex salt disclosed in Japanese Patent Application Laid Open No. 52-79255 and Japanese Patent Application Laid Open No. 58-191414 can be cited.

Recently, as the frequency of power circuits of electronic devices has become higher, corresponding performance is required of capacitors used therewith. However, a solid electrolytic capacitor using a solid electrolyte layer containing manganese dioxide or TCNQ complex salt has the following disadvantages.

Although a solid electrolyte layer containing manganese dioxide is generally formed by repeating thermal decomposition of manganese nitrate, an insulating oxide film is damaged or degraded by heat applied during thermal decomposition or oxidative effect of NOx gas generated during thermal decomposition. Therefore, in the case where a solid electrolyte layer is formed using manganese dioxide, leakage current becomes high, for example, and various characteristics of the capacitor finally obtained tend to be lowered. Further, in the case where a solid electrolyte layer is formed using manganese dioxide, the solid electrolytic capacitor has the disadvantage that impedance thereof becomes higher in the high frequency region.

On the other hand, a solid electrolytic capacitor using TCNQ complex salt does not adequately satisfy the requirement for low impedance of current solid electrolytic capacitors, since the electric conductivity of TCNQ complex salt is about 1 S/cm or lower. It has been further pointed out that the reliability of a solid electrolytic capacitor using TCNQ complex salt as a solid electrolyte is not sufficient for the reason that adhesive strength between TCNQ complex salt and an insulating oxide film is low and the thermal stability of TCNQ complex salt during soldering and with lapse of time is low, and the like. In addition, TCNQ complex salt is expensive and, therefore, the cost of a solid electrolytic capacitor using TCNQ complex salt as a solid electrolyte is high.

For solving these problems occurring when manganese dioxide or TCNQ complex salt is used as a solid electrolyte and obtaining a solid electrolytic capacitor having better characteristics, it has been proposed to use as a solid electrolyte a high molecular compound having high electric conductivity whose manufacturing cost is relatively low, whose adhesive strength to an insulating oxide film is relatively good and whose thermal stability is excellent.

For example, Japanese Patent No. 2,725,553 discloses a solid electrolytic capacitor in which polyaniline formed on an insulating oxide film on the surface of an anode by the chemical oxidation polymerization process.

Further, Japanese Patent Publication No. 8-31400 proposes a solid electrolytic capacitor in which a thin film of metal or manganese dioxide is formed on an insulating oxide film and a conductive polymer film of polypyrrole, polythiophene, polyaniline, polyfuran or the like is formed on the thin film of metal or manganese dioxide by the electrolysis polymerization process, for the reason that it is difficult to form a conductive polymer film having high strength on an insulating oxide film on the surface of an anode only by the chemical oxidation polymerization process and that it is impossible or extremely difficult to directly form an electrolysis polymerization film on an insulating oxide film on the surface of an anode by the electrolysis polymerization process because the insulating oxide film on the surface of an anode is a non-conductor.

Furthermore, Japanese Patent Publication No. 4-74853 proposes a solid electrolytic capacitor in which a conductive polymer film of polypyrrole, polythiophene, polyaniline, polyfuran or the like is formed on an insulating oxide film by the chemical oxidation polymerization process.

On the other hand, size reduction and performance enhancement of an electronic component is required in proportion as the need to reduce the size and thickness of electronic devices increases and as the need increases for a high-performance circuit board capable of being reduced in size and increased in number of layers. In particular, since IC cards are being reduced to a very thin thickness of 1 mm or less and portable personal computers are being reduced to a very thin thickness of 20 mm or less, it is required to form an electronic component to be mounted therein and a printed circuit board on which electronic components are mounted so as to have a thickness of several millimeters to several hundreds of microns.

However, since each of the above mentioned solid electrolytic capacitors is fabricated as an independent component and mounted on a printed circuit board via a solder layer, it is impossible to sufficiently increase the degree of integration and density of an electronic component.

Therefore, Japanese Patent Application Laid Open No. 2-54510 and Japanese Patent No. 2950587 propose to integrally form solid electrolytic capacitors with a board in the manner of forming resistances and conductive patterns on a board, to form a circuit board in which a plurality of solid electrolytic capacitors are formed on a single board, thereby increasing the density of electronic components and reducing the thickness of circuit boards.

More specifically, Japanese Patent Application Laid Open No. 2-54510 discloses a method for fabricating a circuit board having a built-in solid electrolytic capacitor by forming an electric conductor and a conductive pattern of a film-like valve metal substrate such as an aluminum film capable of forming an insulating oxide film on an insulating substrate and sequentially forming an insulating oxide film layer, a conductive polymer layer of a heterocyclic compound and a conductive layer at one portion or several portions of the surface of the pattern of the valve metal substrate and, a multi-layered circuit board having a built-in solid electrolytic capacitor fabricated by laminating a circuit board having a built-in solid electrolytic capacitor fabricated by forming an electric conductor and a conductive pattern of a film-like valve metal substrate such as an aluminum film capable of forming an insulating oxide film on each of both surfaces of an insulating substrate and sequentially forming an insulating oxide film layer, a conductive polymer layer of a heterocyclic compound and a conductive layer at one portion or several portions of the surface of the pattern of the valve metal substrate. According to Japanese Patent Application Laid Open No. 2-54510, the density of electronic components can be increased without mounting individual capacitors on a circuit board by integrally forming a solid electrolytic capacitor using electro-conductive polymer with a board in advance in the manner of forming a resistance layer and a conductive pattern of a circuit board, and the electronic characteristics of an electronic component, such as its noise characteristic, can be simultaneously improved.

On the other hand, Japanese Patent No. 2950587 discloses a solid electrolytic capacitor fabricated by sequentially forming a dielectric layer, an electrolytic layer and a conductive layer on each of surfaces of a plate-like anode substrate, namely, a valve metal substrate, and providing a cathode terminal via each of the conductive layers to form a capacitor component, and bonding circuit boards each having desired wiring on the opposite surfaces of the thus formed capacitor component via resin layers. According to Japanese Patent No. 2950587, since a solid electrolyte is protected by the printed circuit boards disposed on opposite side surfaces thereof even if it is mechanically brittle, a reliable sold electrolytic capacitor can be obtained and it is further possible to easily mount other electronic components on a printed circuit board by forming a desired wiring pattern on the printed circuit board in advance.

Moreover, the frequency of the power circuits of electronic devices has recently become higher and this has made it necessary to lower the equivalent series inductance (ESL) and equivalent series resistance (ESR) of capacitors used in the electronic devices. Even if the initial characteristic ESL value or the like can be markedly improved, such requirement cannot be practically satisfied in the case where the characteristic value is liable to vary in a reliability test such as a high temperature application test or the like. Therefore, it is required to develop an electrolytic capacitor in which the initial characteristic ESL and ESR values are very low and do not vary substantially.

As methods for decreasing the ESL, there are generally known a first method of shortening the length of the electric path as possible, a second method of canceling the magnetic field generated by one electric path by the magnetic field generated by another electric path, and a third method of dividing an electric path into n pieces to decrease the effective ESL to 1/n. For example, the first method and the third method are employed in the invention taught by Japanese Patent Application Laid Open No. 2000-311832, the second method and the third method are employed in the invention taught by Japanese Patent Application Laid Open No. 06-267802 and the third method is employed in the inventions taught by Japanese Patent Application Laid Open No. 06-267801 and Japanese Patent Application Laid Open No. 11-288846.

In such a circuit board having a built-in solid electrolytic capacitor, it is indispensable to connect a lead electrode for connecting the solid electrolytic capacitor with other electronic components to be mounted on the board to a foil-like valve metal substrate capable of forming an insulating oxide film to serve as an anode but in the case of forming a lead electrode by merely connecting a copper or other such metal conductor with the foil-like valve metal substrate, desired capacitor characteristics cannot be obtained.

More specifically, in order to obtain a solid electrolytic capacitor having large electrostatic capacitance, a solid electrolytic capacitor is fabricated by roughening (enlarging) the surface of a foil-like valve metal substrate so as to increase the surface area of the foil-like valve metal substrate, cutting a foil-like valve metal substrate of desired size from a film sheet of a valve metal such as aluminum formed with an insulating oxide film such as aluminum oxide, forming a solid high molecular polymer electrolyte layer to serve as a cathode on the insulating oxide film of the film-like valve metal whose surface was roughened, and further providing conductive layers such as a carbon paste layer, a silver paste layer and the like on the solid high molecular polymer electrolyte layer to serve as a cathode, thereby forming a lead electrode serving a cathode. Therefore, in order to form a lead electrode to serve as an anode, it is necessary to remove the insulating oxide film formed on the roughened surface of the foil-like valve metal substrate and connect a copper or other such metal conductor to the foil-like valve metal substrate by ultrasonic welding, cold welding or the like so that electric connection can be established between metals. Since the foil-like valve metal substrate on which the lead electrode has thus been formed is cut from the sheet of a valve metal, no insulating oxide film is formed at the edge portions of the foil-like valve metal substrate and when no insulating oxide film is formed at the edge portions of the foil-like valve metal substrate, the solid electrolytic capacitor does not function because metal portions of the foil-like valve metal substrate come into contact with the solid high molecular polymer electrolyte layer. Therefore, it is indispensable to form insulating oxide films at the edge portions of the foil-like valve metal substrate by anodic oxidation.

However, when anodic oxidation is performed by dipping the anode electrode formed by connecting a copper or other such metal conductor to the foil-like valve metal substrate by ultrasonic welding, cold welding or the like into a forming solution such as an ammonium adipate solution accommodated in a conductive vessel such as a beaker made of stainless steel, connecting the copper or other such metal conductor to a plus pole and connecting the conductive vessel to a minus pole, if the copper or other such metal conductor comes into contact with the forming solution, an electric current continuously flows and, as a result, the copper or other such metal conductor is corroded, so that insulating oxide films cannot be formed at edge portions of the foil-like valve metal substrate. Further, in the case of dipping only the foil-like valve metal substrate whose surface has been roughened into the forming solution to perform anodic oxidation, since the surface of the foil-like valve metal substrate is roughened, the forming solution reaches the copper or other such metal conductor due to the capillary phenomenon. Therefore, an electric current continuously flows similarly to the above case and since the copper or other such metal conductor is corroded, insulating oxide films cannot be formed at edge portions of the foil-like valve metal substrate.

Theoretically, these problems can be solved by in advance bonding the copper or other such metal conductor to the foil-like valve metal substrate, providing electrodes at the edge portions of the foil-like valve metal substrate where no insulating oxide film is formed and conducting anodic oxidation processing on the edge portions to form insulating oxide films at the edge portions of the foil-like valve metal substrate. However, since the thickness of a film-like sheet of a valve metal substrate such as aluminum is generally of the order of 100 micron, it is very difficult to provide electrodes at the edge portions of the foil-like valve metal substrate where no insulating oxide film is formed and conduct anodic oxidation processing on the edge portions. It is therefore impossible to fabricate a solid electrolytic capacitor suitable for building into a circuit board.

Further, as pointed out above, the frequency of the power circuits of electronic devices has recently become higher and this has made it necessary to lower the equivalent series resistance (ESR) and equivalent series inductance (ESL) of capacitors used in the electronic devices. Even if the initial characteristic ESL value or the like can be markedly improved, such requirement cannot be practically satisfied in the case where the characteristic value is liable to vary in a reliability test such as a high temperature application test or the like. Therefore, it is required to develop an electrolytic capacitor in which initial characteristic ESL and ESR values are very low and do not vary substantially.

SUMMARY OF THE INVENTION

It is therefore an object of the present invention to provide a solid electrolytic capacitor and a circuit board having a built-in solid electrolytic capacitor which is constituted by forming a solid high molecular polymer electrolyte layer and a conductive layer on a foil-like valve metal substrate formed with an insulating oxide film on the surface thereof, can reduce the ESL and is suitable for being mounted on or built in a circuit board, and methods for manufacturing them.

The inventors of the present invention vigorously pursued a study for accomplishing the above object and, as a result, reached the conclusion that the above objects of the present invention could be accomplished by bonding one end portion region of a valve metal body to one of two opposite end portion regions of a foil-like valve metal substrate formed with an insulating oxide film so that electric connection could be established between valve metals, thereby fabricating an electrode body for a three terminal type solid electrolytic capacitor component.

In a study done by the inventors of the present invention, it was found that in the case where an electrode body for a solid electrolytic capacitor component was fabricated by bonding one end portion region of a valve metal body to one of two opposite end portion regions of a foil-like valve metal substrate formed with an insulating oxide film so that electric connection could be established between valve metals, even when insulating oxide films were formed using anodic oxidization at edge portions of the foil-like valve metal substrate where no insulating oxide film was formed, the forming solution could be prevented from reaching the valve metal body beyond a portion where the one end portion region of the foil-like valve metal substrate and the one end portion region of the valve metal body whose surface was not roughened were bonded to each other and, as a result, since anodic oxidization was completed when the insulating oxide film was formed at the portion where the one end portion region of the foil-like valve metal substrate and the one end portion region of the valve metal body were bonded to each other, insulating oxide films could be formed at edge regions of the foil-like valve metal substrate in a desired manner.

However, it was found that in the case of building a solid electrolytic capacitor including the electrode body for a solid electrolytic capacitor thus obtained by forming the insulating oxide film at the edge portions of the foil-like valve metal substrate in a circuit board, an insulating oxide film formed on the surface of the valve metal body with passage of time and as a result, when contacts with other electronic devices to be mounted on the circuit board were formed on the surface of the valve metal body whose surface was not roughened, the resistance of the insulating oxide film became large and the impedance characteristic of the capacitor became worse.

Therefore, the objects of the present invention can be accomplished by bonding one end portion region of a valve metal body to one of two opposite end portion regions of a foil-like valve metal substrate formed with an insulating oxide film so that electric connection can be established between valve metals, thereby fabricating an electrode body for a solid electrolytic capacitor component.

According to the present invention, since an electrode body for a solid electrolytic capacitor component is fabricated by bonding one end portion region of a valve metal body to one of two opposite end portion regions of a foil-like valve metal substrate formed with an insulating oxide film so that electric connection can be established between the valve metals and bonding one end portion region of a conductive metal substrate to the other end portion region of the foil-like valve metal substrate so that electric connection can be established between the metals, even in the case of forming an insulating oxide film at the edge portions of the foil-like valve metal substrate formed with no insulating oxide film by anodic oxidization, the forming solution can be prevented from reaching the conductive metal substrate beyond a portion where the one end portion region of the foil-like valve metal substrate and the one end portion region of the valve metal body are bonded to each other. Therefore, since no electrical current flows when an insulating oxide film is formed at the portion where the one end portion region of the foil-like valve metal substrate and the one end portion region of the valve metal body are bonded to each other, thereby completing anodic oxidization, it is possible to form an insulating oxide film at the edge portions of the foil-like valve metal substrate in a desired manner. Further, even in the case where an insulating oxide film forms with passage of time on the surface of the foil-like valve metal substrate whose surface is not roughened after a solid electrolytic capacitor was built in a circuit board, since one end portion region of the film-like conductive metal is further bonded to the other end portion region of the foil-like valve metal substrate whose surface is not roughened so that electrical connection can be established, a solid electrolytic capacitor having a desired impedance characteristic can be built in the circuit board by providing contacts with other electronic devices to be mounted on the circuit board on the film-like conductive metal. Moreover, the ESL can be markedly reduced by constituting a solid electrolytic capacitor so as to have an electrode having three terminals.

In a preferred aspect of the present invention, a plurality of solid electrolytic capacitor components are disposed independent of each other on a lead frame, conductive layers each provided in one of the solid electrolytic capacitor components are electrically connected with each other by the lead frame and a part of a cathode lead electrode is drawn out from one surface of a region where the lead frame and the conductive layers of the solid electrolytic capacitor components intersect with each other in a direction perpendicular to the one surface of the region.

According to this preferred aspect of the present invention, it is possible to constitute a solid electrolytic capacitor as a discrete type solid electrolytic capacitor including a plurality of array-like disposed solid electrolytic capacitor components each having three terminals and since the cathode lead electrode is common to the plurality of solid electrolytic capacitor components, it is possible, depending upon how an electronic circuit is constituted, to operate the solid electrolytic capacitor components independently or increase the capacitance of a solid electrolytic capacitor by connecting a plurality of solid electrolytic capacitor components in parallel. Therefore, a solid electrolytic capacitor according to this preferred aspect of the present invention is versatile.

The above and other objects of the present invention can also be accomplished by a circuit board having a built-in solid electrolytic capacitor including at least one solid electrolytic capacitor component having a foil-like valve metal substrate, a valve metal body whose one end portion region is bonded to each of one opposite end portion regions of the foil-like valve metal substrate so that electrical connection can be established between the valve metals, a conductive metal substrate whose one end portion region is bonded to the other end portion region of the foil-like valve metal substrate so that electrical connection can be established between the metals and a cathode electrode formed by sequentially forming at least a solid high molecular polymer electrolyte layer and a conductive layer on the foil-like valve metal substrate, the at least one solid electrolytic capacitor component being mounted on one surface of a first insulating substrate formed with at least one wiring pattern so as to electrically connect with the wiring pattern and being accommodated within a substantially closed space defined by the first insulating substrate and a second insulating substrate facing the first insulating substrate and formed with at least one wiring pattern.

In a preferred aspect of the present invention, a plurality of solid electrolytic capacitor components are disposed independent of each other on the first insulating substrate, conductive layers each provided in one of the solid electrolytic capacitor components are electrically connected with each other by the corresponding wiring pattern and a part of the wiring pattern is drawn out from one surface of a region where the wiring pattern and the conductive layers of the solid electrolytic capacitor components intersect with each other in a direction perpendicular to the one surface of the region so as to pass through the first insulating substrate.

The above and other objects of the present invention can be also accomplished by a method for manufacturing a solid electrolytic capacitor comprising steps of bonding one end portion region of a valve metal body to one of two opposite end portion regions of a foil-like valve metal substrate formed with an insulating oxide film so that electric connection can be established between the valve metals, bonding one end portion region of a conductive metal substrate to the other end portion region so that electric connection can be established between the metals to fabricate an electrode body for a solid electrolytic capacitor component, masking, of the whole electrode body, a part of the valve metal body and the entire conductive metal substrate bonded to the valve metal body, dipping, of the whole electrode body, the whole foil-like valve metal substrate, the entire masked portion and a part of the valve metal body which is not masked in a forming solution, applying voltage to the electrode body to effect anodic oxidization thereon and form an insulating oxide film at least at an edge portion of the foil-like valve metal substrate, forming a solid high molecular polymer electrolyte layer on the substantially entire surface of the foil-like valve metal substrate, and coating the solid high molecular polymer electrolyte layer with the conductive paste and drying the conductive paste to form a conductive layer.

The above and other objects of the present invention can be also accomplished by a method for manufacturing a circuit board having a built-in solid electrolytic capacitor comprising steps of bonding one end portion region of a valve metal body to one of two opposite end portion regions of a foil-like valve metal substrate formed with an insulating oxide film so that electric connection can be established between the valve metals, bonding one end portion region of a conductive metal substrate to the other end portion region so that electric connection can be established between the metals to fabricate an electrode body for a solid electrolytic capacitor component, masking, of the whole electrode body, a part of the valve metal body and the entire conductive metal substrate bonded to the valve metal body, dipping, of the whole electrode body, the whole foil-like valve metal substrate, the entire masked portion and a part of the valve metal body which is not masked in a forming solution, applying voltage to the electrode body to effect anodic oxidization thereon and form an insulating oxide film at least at an edge portion of the foil-like valve metal substrate, forming a solid high molecular polymer electrolyte layer on the substantially entire surface of the foil-like valve metal substrate, coating the solid high molecular polymer electrolyte layer with the conductive paste and drying the conductive paste to form a conductive layer, mounting at least one solid electrolytic capacitor thus fabricated on one surface of a first insulating substrate formed with at least one wiring pattern so as to electrically connect with the wiring pattern, and accommodating the solid electrolytic capacitor within a substantially closed space defined by the first insulating substrate and a second insulating substrate facing the first insulating substrate and formed with at least one wiring pattern.

In the present invention, the valve metal substrate is formed of metal or alloy selected from a group consisting of metal capable of forming an insulating oxide film and alloys thereof. Illustrative examples of valve metals preferably usable in the present invention include one kind of metal or alloy of two or more kinds of metal selected from a group consisting of aluminum, tantalum, titanium, niobium and zirconium. Aluminum and tantalum are most preferable. An anodic electrode is formed by processing the metal or alloy into a foil.

In the present invention, the material for making the conductive metal is not particularly limited but may be any type of metal or alloy insofar as it has conductivity. The conductive metal can preferably be made of metal or alloy which can connected by soldering and more preferably be formed of one kind of metal or alloy of two or more kinds of metal selected from a group consisting of copper, brass, nickel, zinc and chromium. Among these, copper is most preferably used for forming the conductive metal from the viewpoint of electric characteristics, workability in following steps, cost and the like.

In the present invention, the solid high molecular polymer electrolyte layer contains a conductive high molecular polymer compound and is preferably formed on the foil-like valve metal substrate whose surface is roughened and is formed with an insulating oxide film by chemical oxidation polymerization or electrolytic oxidation polymerization.

In the case of forming the solid high molecular polymer electrolyte layer using chemical oxidation polymerization, concretely, the solid high molecular polymer electrolyte layer is formed on the foil-like valve metal substrate whose surface is roughened and is formed with an insulating oxide film in the following manner, for example.

First, a solution containing an oxidizing agent at 0.001 to 2.0 mol/liter or a solution to which a compound serving as a dopant is further added is uniformly applied on the foil-like valve metal substrate whose surface is roughened and formed with an insulating oxide film using a coating method or a spray method.

Then, a solution preferably containing raw monomer of a conductive high molecular polymer compound in an amount of at least 0.01 mol/liter, or raw monomer of a conductive high molecular polymer compound itself, is brought into direct contact with the insulating oxide film formed on the surface of the foil-like valve metal substrate, whereby the raw monomers are polymerized to synthesize a conductive high molecular polymer compound and a solid high molecular polymer electrolyte layer of the conductive high molecular polymer compound is formed on the insulating oxide film formed on the surface of the foil-like valve metal substrate.

In the present invention, as a conductive high molecular polymer compound contained in the solid high molecular polymer electrolyte layer, it is preferable to select a compound whose raw monomer is selected from a group consisting of a substituted or non-substituted n-conjugated heterocyclic compound, a substituted or non-substituted conjugated aromatic compound and a substituted or non-substituted hetero atom containing conjugated aromatic compound. Among these, a conductive high molecular polymer compound whose raw monomer is a substituted or non-substituted π-conjugated heterocyclic compound is most preferable. Further, a conductive high molecular polymer compound selected from a group consisting of polyaniline, polypyrrole, polythiophene and polyfuran and derivatives thereof is preferably employed and polyaniline, polypyrrole or polyethylene dioxythiophene is particularly preferable.

In the present invention, illustrative examples of raw monomers of conductive high molecular polymer compounds preferably used for the solid high molecular polymer electrolyte layer include (nonsubstituted) anilines, alkyl anilines, alkoxy anilines, halogenated anilines, ortho-phenylenediamines, 2,6-dialkyl anilines, 5-dialkoxy anilines, 4,4'-diaminodiphenyl ether, pyrrole, 3-methylpyrrole, 3-ethylpyrrole, 3-propylpyrrole, thiophene, methylthiophene, 3-ethylthiophene, 3,4-ethylenedioxythiophene and the like.

In the present invention an oxidizing agent used for chemical oxidization polymerization is not particularly limited and for example, iron(III) salts such as iron(III) chloride, iron(III) sulfide and iron(III) ferricyanide, ceric(IV) salts such as ceric sulfate and ceric ammonium nitrate, halides such as iodine, bromine, bromine iodide and the like, metal halides such as silicon pentafluoride, antimony pentafluoride, silicon tetrafluoride, phosphorus pentachloride, phosphorus pentafluoride, aluminum chloride, molybdenum pentachloride and the like, proton acids such as sulfuric acid, nitric acid, fluorosulfonic acid, trifluoromethanesulfuric acid, chlorosulfuric acid and the like, oxygen compounds such as sulfur trioxide, nitrogen dioxide and the like, persulfates such as sodium persulfate, potassium persulfate, ammonium persulfate and the like, and peroxides such as hydrogen peroxide, potassium permanganate, peracetic acid, difluorosulfonyl peroxiside and the like are preferably used as an oxidizing agent.

In the present invention, illustrative examples of compounds serving as a dopant which are added as occasion demands include salts such as $LiPH_6$, $LiAsF_6$, $NaPF_6$, $KPF_6$, $KAsF_6$ whose anion is hexafluorophosphate anion or hexafluoroarsenate (V) anion and whose cation is an alkaline metal cation such as lithium, sodium, potassium and the like; boron tetrafluorides such as $LiBF_4$, $NaBF_4$, $NH_4BF_4$, $(CH_3)_4NBF_4$, $(n-C_4H_9)_4NBF_4$ and the like; sulfonic acids such as p-toluene sulfonic acid, p-ethyl benzene sulfonic acid, p-hydroxybenzene sulfonic acid, dodecylbenzene sulfonic acid, methyl sulfonic acid, dodecyl sulfonic acid, benzene sulfonic acid, β-naphthalene sulfonic acid or the like and derivatives thereof; alkylnaphthalene/sulfonic acids such as butylnaphthalene sodium sulfonate, 2,6-naphthalene sodium disulfonate, toluene sodium sulfonate, toluene tetrabutyl ammonium sulfonate, or the like and the derivatives thereof; metal halides such as ferric chloride, ferric bromide, cupric chloride, cupric bromide or the like; hydrochloric acid, hydrogen bromide, hydrogen iodide, sulfuric acid, phosphoric acid, nitric acid or alkaline metal salt thereof, alkaline earth metal salt thereof or ammonium salt thereof; halogen acid such as perhalogen acid or a salt thereof such as perchloric acid, sodium perchlorate or the like; inorganic acid or a salt thereof; halogenated carboxylic acids such as monocarboxylic acid or dicarboxylic acid such as acetic acid, oxalic acid, formic acid, butyric acid, succinic acid, lactic acid, citric acid, phthalic acid, maleic acid, benzoic acid, salicylic acid, nicotinic acid or the like, aromatic heterocyclic carboxylic acid, trifluoroacetic acid and salts thereof.

In the present invention, each of the oxidizing agent and the compound serving as a dopant is dissolved in water or an organic solvent and used in the form of a suitable solution. A single kind of solvent or mixed solvents may be used. It is effective to use mixed solvents for increasing the solubility of a compound serving as a dopant. It is preferable for solvents used in mixed solvents to have compatibility therewith and compatibility with an oxidizing agent and the compound serving as a dopant. Illustrative examples of solvents include organic amides, sulphur-containing compounds, esters and alcohols.

On the other hand, in the case of forming the solid high molecular polymer electrolyte layer on the foil-like valve metal substrate whose surface is roughened and is formed with an insulating oxide film by electrolytic oxidation polymerization, as well known, a conductive base layer is used as an operational electrode and immersed together with a counter electrode in an electrolysis solution containing a raw monomer of a conductive high molecular polymer compound and supporting electrolyte and an electric current is supplied to the electrolysis solution, thereby forming a solid high molecular polymer electrolyte layer.

Concretely, a thin conductive base layer is first formed preferably by chemical oxidization polymerization on the foil-like valve metal substrate whose surface is roughened and which is formed with an insulating oxide film. The thickness of the conductive base layer is controlled by controlling the number of repetitions of the polymerization under the same polymerization condition. The number of polymerization repetitions is determined depending upon the kind of raw monomer.

The conductive base layer may be formed of metal, metal oxide having conductivity or a conductive high molecular polymer compound but it is preferable to form the conductive base layer of a conductive high molecular polymer compound. As the raw monomer for forming the conductive base layer, a raw monomer used for chemical oxidation polymerization can be employed and in such a case, a conductive high molecular polymer compound contained in the conductive base layer is the same as that contained in the solid high molecular polymer electrolyte layer formed by chemical oxidization polymerization. In the case where ethylene dioxythiophene or pyrrole is employed as raw monomer for forming the conductive base layer, the conductive base layer may be formed by determining the number of polymerization repetitions so that an amount of the conductive high molecular polymer compound to be produced becomes equal to 10% to 30% of the amount of the conductive high molecular polymer compound produced when the solid high molecular polymer electrolyte layer is formed only by chemical oxidization polymerization.

Thereafter, the conductive base layer is used as an operational electrode and immersed together with a counter electrode in an electrolysis solution containing a raw monomer of a conductive high molecular polymer compound and supporting electrolyte and an electric current is supplied to the electrolysis solution, thereby forming a solid high molecular polymer electrolyte layer.

Various additives may as occasion demands be added to an electrolytic solution in addition to raw monomer of a conductive high molecular polymer compound and supporting electrolyte.

The conductive high molecular polymer compound usable for forming the solid high molecular polymer electrolyte layer is the same as that used for the conductive base layer and, therefore, the same as that used for chemical oxidization polymerization, and it is preferable to select a conductive high molecular polymer compound whose raw monomer is selected from a group consisting of a substituted or non-substituted π-conjugated heterocyclic compound, a substituted or non-substituted conjugated aromatic compound and a substituted or non-substituted hetero atom containing conjugated aromatic compound. Among these, a conductive high molecular polymer compound whose raw monomer is a substituted or non-substituted π-conjugated heterocyclic compound is most preferable. Further, a conductive high molecular polymer compound selected from a group consisting of polyaniline, polypyrrole, polythiophene and polyfuran and derivatives thereof is preferably employed and polyaniline, polypyrrole or polyethylene dioxythiophene is particularly preferable.

The supporting electrolyte is selected depending upon the combination of a monomer and a solvent and illustrative examples of the supporting electrolyte include sodium hydroxide, potassium hydroxide, ammonium hydroxide, sodium carbonate, sodium acid carbonate and the like as a basic compound, sulfuric acid, hydrochloric acid, nitric acid, hydrogen bromide, perchloric acid, trifluoroacetic acid, sulfonic acid and the like as an acidic compound, and sodium chloride, sodium bromide, potassium iodide, potassium chloride, potassium nitrate, sodium periodate, sodium perchlorate, lithium perchlorate, ammonium iodide, ammonium chloride, fluoroborate, tetramethylammonium chloride, tetraethylammonium chloride, tetramethylammonium bromide, tetraethylammonium bromide, tetraethylammonium perchloride, tetrabutylammonium perchloride, tetramethylammonium, D-toluenesulfonic acid chloride, poly(di-salicylic acid triethylamine, 10-camphorsulfonic acid sodium salt and the like as a salt.

In the present invention, the concentration of the supporting electrolyte may be determined so as obtain desired electrical current density and is not particularly limited. The concentration of the supporting electrolyte is generally set to 0.05 to 1.0 mol/liter.

In the present invention, the solvent used for electrolytic oxidation polymerization is not particularly limited and may be selected from water, a protic solvent, an aprotic solvent or a mixed solvent containing two or more these solvents. As the mixed solvent, it is preferable to select a mixed solvent containing solvents having compatibility and compatible with the monomer and the supporting electrolyte.

Illustrative examples of a protic solvent usable in the present invention include formic acid, acetic acid, propionic acid, methanol, ethanol, n-propanol, iso-propanol, tert-butanol, methyl cellosolve, diethylamine, ethylenediamine and the like.

Illustrative examples of an aprotic solvent usable in the present invention include methylene chloride, 1,2-dichloroethane, carbon disulfide, acetonitrile, acetone, propylene carbonate, nitromethane, nitrobenzene, ethyl acetate, diethyl ether, tetrahydrofuran, dimethoxyethane, dioxane, N,N-dimethylacetamide, N,N-dimethylformamide, pyridine, dimethyl sulfoxide and the like.

In the present invention, in the case where the solid high molecular polymer electrolyte layer is formed by electrolytic oxidation polymerization, any of a constant voltage method, a constant electrical current method and a potential sweep method may be employed. Further, during the process of electrolytic oxidation polymerization, a conductive high molecular polymer compound may be polymerized by combining the constant voltage method and the constant electrical current method. The electrical current density is not particularly limited but is about 500 mA/cm$^2$ at the maximum.

In the present invention, as disclosed in Japanese Patent Application Laid Open No. 2000-100665, chemical oxidation polymerization or electrolytic oxidation polymerization can be performed while an ultrasonic wave is being projected, thereby polymerizing a conductive high molecular polymer compound. In the case of polymerizing a conductive high molecular polymer compound while an ultrasonic wave is being projected, the film quality of the solid high molecular polymer electrolyte layer can be improved.

In the present invention, the thickness of the solid high molecular polymer electrolyte layer is not particularly limited insofar as raised and depressed portions formed on the surface of an anode electrode formed by the etching process or the like can be completely filled by the solid high molecular polymer electrolyte layer. The thickness of the solid high molecular polymer electrolyte layer is generally 5 to 100 $\mu$m.

In the present invention, the solid electrolytic capacitor further includes a conductive layer serving as a cathode electrode on the solid high molecular polymer electrolyte layer and a graphite paste layer and a silver paste layer may be formed as the conductive layer. The graphite paste layer and the silver paste layer can be formed by a screen printing method, a spray coating method or the like. Although the cathode electrode can be formed by only the silver paste layer, in the case of further forming the graphite paste layer, it is possible to prevent the migration of silver in comparison with the case of forming only the silver paste layer.

When the graphite paste layer and the silver paste layer are to be formed as the cathode electrode, portions other than a portion corresponding to that of the foil-like valve metal substrate whose surface is roughened and which is formed with an insulating oxide film are masked by a metal mask or the like and the graphite paste layer and the silver paste layer are formed at only the portion corresponding to that of the foil-like valve metal substrate whose surface is roughened and which is formed with an insulating oxide film.

In the present invention, the solid electrolytic capacitor is fixed onto one surface of an insulating substrate the other surface of which is formed with at least one wiring pattern or surfaces of a pair of insulating substrates which face each other and the other surfaces of which are formed with at least one wiring pattern.

In the present invention, the material for forming the insulating substrate is not particularly limited and the insulating substrate can be formed of a phenol resin, a polyimide resin, an epoxy resin, a polyester resin or the like which has a good adhesive property and good solvent resistance. Further, the insulating substrate may be formed of an inorganic material instead of an organic material and a substrate made of metal oxides such as an alumina substrate can be used as an insulating substrate in the present invention.

DESCRIPTION OF THE PREFERRED EMBODIMENTS

Hereinafter, preferred embodiments of the present invention will be described in detail with reference to accompanying drawings.

Figure 1:
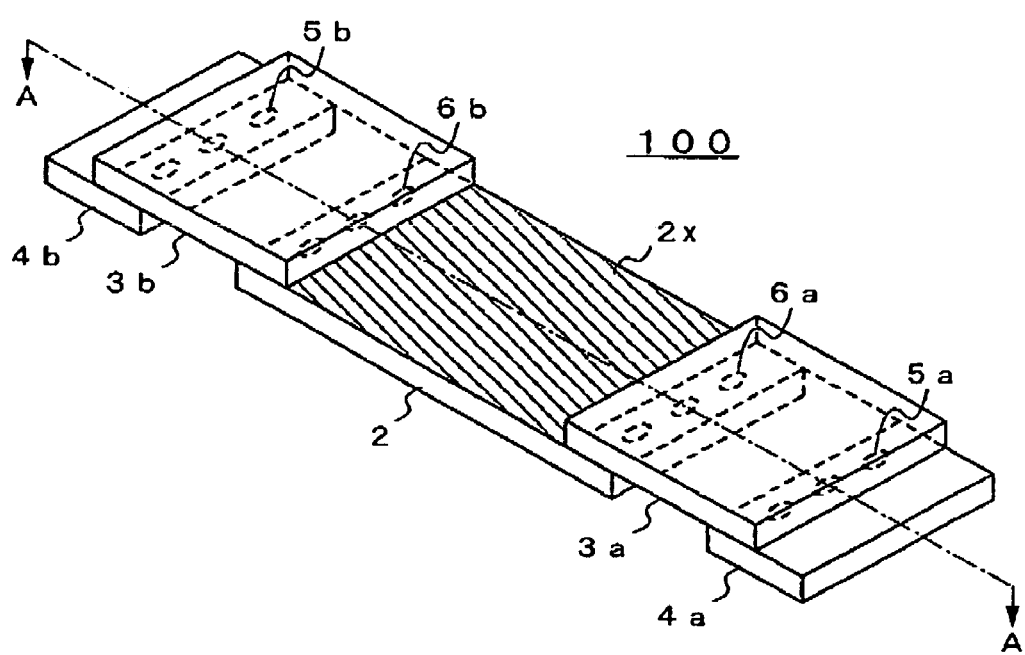
FIG. 1 is a schematic perspective view showing an electrode body for a solid electrolytic capacitor component (hereinafter sometimes simply referred to as an electrode) used for a solid electrolytic capacitor which is a preferred embodiment of the present invention.
Figure 2:
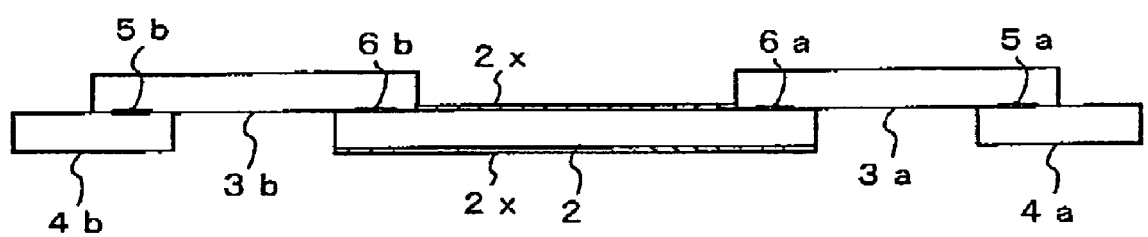
FIG. 2 is a schematic cross sectional view of an electrode body for a solid electrolytic capacitor component taken along a line A—A in FIG. 1.

FIG. 1 is a schematic perspective view showing an electrode body for a solid electrolytic capacitor component (hereinafter sometimes simply referred to as an electrode) used for a solid electrolytic capacitor which is a preferred embodiment of the present invention and FIG. 2 is a schematic cross sectional view of the electrode body for a solid electrolytic capacitor component taken along a line A—A in FIG. 1.

In this embodiment, aluminum is used as a valve metal capable of forming an insulating oxide film and as shown in FIGS. 1 and 2, an electrode body 100 of the solid electrolytic capacitor according to this embodiment includes a foil-like aluminum substrate 2 whose surface is roughened or enlarged and which is formed with an aluminum oxide film 2x on the surface thereof as an insulating oxide film, two foil-like aluminum substrates 3a, 3b whose surfaces are not roughened, and two foil-like copper substrates 4a, 4b as a metal electric conductor for constituting a lead electrode.

To one end portion region of the foil-like aluminum substrate 2 whose surface is roughened and which is formed with an aluminum oxide film 2x on the surface thereof, one end portion region of the foil-like aluminum substrate 3a whose surface is not roughened is bonded by ultrasonic welding so as to establish electrical connection between the valve metals and one end portion region of the foil-like copper substrate 4a is further bonded to the other end portion region of the foil-like aluminum substrate 3a whose surface is not roughened by ultrasonic welding so as to establish electrical connection between the metals.

Furthermore, to the other end portion region of the foil-like aluminum substrate 2 whose surface is roughened and which is formed with an aluminum oxide film 2x on the surface thereof, one end portion region of the foil-like aluminum substrate 3b whose surface is not roughened is bonded by ultrasonic welding so as to establish electrical connection between the valve metals and one end portion region of the foil-like copper substrate 4b is further bonded to the other end portion region of the foil-like aluminum substrate 3b whose surface is not roughened by ultrasonic welding so as to establish electrical connection between the metals.

When the electrode body 100 is to be formed, the two foil-like copper substrates 4a, 4b for forming a lead electrode are first cut from a copper foil sheet so as to have a predetermined size. Further, the two foil-like aluminum substrates 3a, 3b are cut from an aluminum foil sheet whose surface is not roughened so as to have a predetermined size. Then, the foil-like copper substrate 4a and the foil-like aluminum substrate 3a whose surface is not roughened are superposed in such a manner that end portion regions thereof having predetermined areas are overlapped. Further, the foil-like copper substrate 4b and the foil-like aluminum substrate 3b whose surface is not roughened are superposed in such a manner that end portion regions thereof having predetermined areas are overlapped.

The end portion region of the foil-like copper substrate 4a or 4b and the end portion region of the foil-like aluminum substrate 3a or 3b superposed in this manner are connected to each other by ultrasonic welding, thereby forming a welding connected portion 5a or 5b. Even in the case where an aluminum oxide film is formed on the surface of the foil-like aluminum substrate 3a or 3b, the aluminum oxide film is removed by connecting the foil-like copper substrate 4a or 4b to the foil-like aluminum substrate 3a or 3b by ultrasonic welding, whereby the end portion region of the foil-like copper substrate 4a or 4b and the end portion region of the foil-like aluminum substrate 3a or 3b are electrically connected to each other. The areas of the end portion region of the foil-like copper substrate 4a or 4b and the end portion region of the foil-like aluminum substrate 3a or 3b to be superposed are determined so that the connected portion can have a predetermined strength.

The foil-like aluminum substrate 2 whose surface is roughened and which is formed with an aluminum oxide film on the surface thereof is then cut from an aluminum foil sheet so as to have a predetermined size and the foil-like aluminum substrate 3a whose surface is not roughened and which is bonded to the foil-like copper substrate 4a and the foil-like aluminum substrate 3b whose surface is not roughened and which is bonded to the foil-like copper substrate 4b are superposed on the foil-like aluminum substrate 2 in such a manner that end portion regions thereof having predetermined areas are overlapped.

Then, one of the end portion regions of the foil-like aluminum substrate 2 whose surface is roughened and the end portion region of one of the foil-like aluminum substrate 3a and 3b whose surfaces are not roughened are in their superimposed condition bonded by ultrasonic welding, thereby forming a welding connected portion 6a or 6b. The aluminum oxide film formed on the surface of the foil-like aluminum substrate 2 is removed by bonding the foil-like aluminum substrate 2 and the foil-like aluminum substrate 3a or 3b by ultrasonic welding, whereby the metal at the end portion region of foil-like aluminum substrate 2 whose surface is roughened and the metal at the end portion region of the foil-like aluminum substrate 3a or 3b whose surface is not roughened are electrically connected. The areas of the end portion region of the foil-like aluminum substrate 3a or 3b and the end portion region of the foil-like aluminum substrate 2 to be superposed are determined so that the connected portion can have a predetermined strength.

Since the foil-like aluminum substrate 2 whose surface is roughened and which is formed with the aluminum oxide film on the surface thereof is cut from an aluminum foil sheet, no aluminum oxide film is formed on an edge portion thereof and, therefore, it is required to form an aluminum oxide film on an edge portion of the foil-like aluminum substrate 2 whose surface is roughened by anodic oxidation in order to use the thus formed electrode body 100 as an anodic electrode of a solid electrolytic capacitor.

Figure 3:
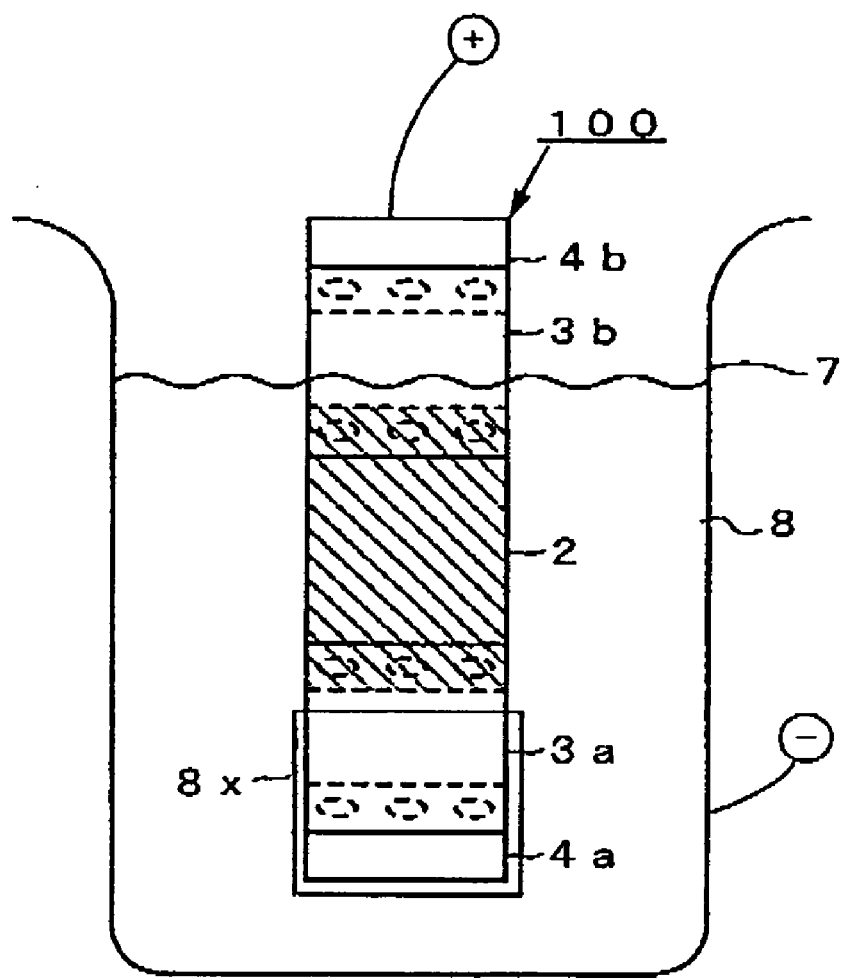
FIG. 3 is a schematic cross sectional view showing an anodic oxidization method for forming an aluminum oxide film on an edge portion of a foil-like aluminum substrate 2 whose surface is roughened.

FIG. 3 is a schematic cross sectional view showing an anodic oxidation method for forming an aluminum oxide film on an edge portion of the foil-like aluminum substrate 2 whose surface is roughened.

As shown in FIG. 3, a part of the foil-like aluminum substrate 3a whose surface is not roughened and which is not superposed on the foil-like aluminum substrate 2 whose surface is roughened and the whole foil-like copper substrate 4a disposed on one side of the electrode body 100 are first masked with thermosetting resist 8x. Then, the electrode body 100 is set in a forming solution 8 consisting of an ammonium adipate solution accommodated in a beaker made of stainless steel in such a manner that the whole foil-like aluminum substrate 2 whose surface is roughened, a part of the foil-like aluminum substrate 3a whose surface is not roughened and the whole foil-like copper substrate 4a which have been masked are immersed in the forming solution 8 and voltage is applied with the foil-like copper substrate 4b connected to the plus side and the beaker 7 made of stainless steel connected to the minus side.

The applied voltage can be determined in accordance with the thickness of the aluminum oxide film to be formed and when an aluminum oxide film having a thickness of 10 nm to 1 $\mu$m is to be formed, the applied voltage is normally determined to be several volts to about twenty volts.

As a result, anodic oxidation is started. Although the forming solution 8 moves upward due to the capillary phenomenon during the anodic oxidation operation since the surface of the foil-like aluminum substrate 2 is roughened, it does not move upward to the foil-like copper substrate 4b beyond the connected portion of the foil-like aluminum substrate 2 whose surface is roughened and the foil-like aluminum substrate 3b whose surface is not roughened since the surface of the foil-like aluminum substrate 3b is not roughened. Further, since the part of the foil-like aluminum substrate 3a whose surface is not roughened and the whole foil-like copper substrate 4a are masked with thermosetting resist 8x, they do not come into contact with the forming solution 8.

Therefore, it is possible to reliably prevent the forming solution from coming into contact with the foil-like copper substrates 4a and 4b for constituting a lead electrode and an aluminum oxide film is formed on only a region which includes an edge portion of the foil-like aluminum substrate 2 whose surface is roughened and the edge portions of the foil-like aluminum substrates 3a and 3b whose surfaces are not roughened and which are connected to the foil-like aluminum substrate 2 whose surface is roughened.

On the whole surface of the foil-like aluminum substrate 2 whose surface is roughened and which is formed with the aluminum oxide film on the surface thereof of the thus fabricated electrode body 100, a cathode electrode of conductive high molecular polymer or the like is formed by a well known process, thereby fabricating a solid electrolytic capacitor component.

Figure 4:
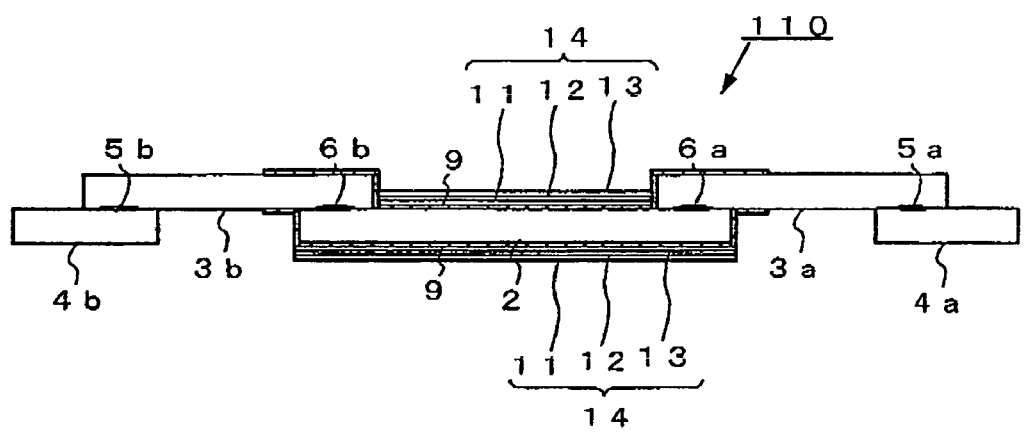
FIG. 4 is a schematic cross sectional view showing a solid electrolytic capacitor component.

FIG. 4 is a schematic cross sectional view showing a solid electrolytic capacitor component.

As shown in FIG. 4, the solid electrolytic capacitor component 110 includes a cathode electrode 14 formed by laminating a solid high molecular polymer electrolyte layer 11, a graphite paste layer 12 and a silver paste layer 13 on the substantially whole surface of the foil-like aluminum substrate 2 whose surface is roughened and which is formed with the aluminum oxide film 9.

The solid high molecular polymer electrolyte layer 11 containing conductive high molecular polymer is formed by chemical oxidation polymerization or electrolytic oxidation polymerization on the substantially whole surface of the foil-like aluminum substrate 2 whose surface is roughened and which is formed with the aluminum oxide film 9, and the graphite paste layer 12 and the silver paste layer 13 are formed on the solid high molecular polymer electrolyte layer 11 by the screen printing method or the spray coating method.

The thus fabricated solid electrolytic capacitor component 110 is fixed between a pair of insulating substrates after removing the mask of thermosetting resist 8x and a circuit board having a built-in solid electrolytic capacitor is fabricated.

Figure 5:
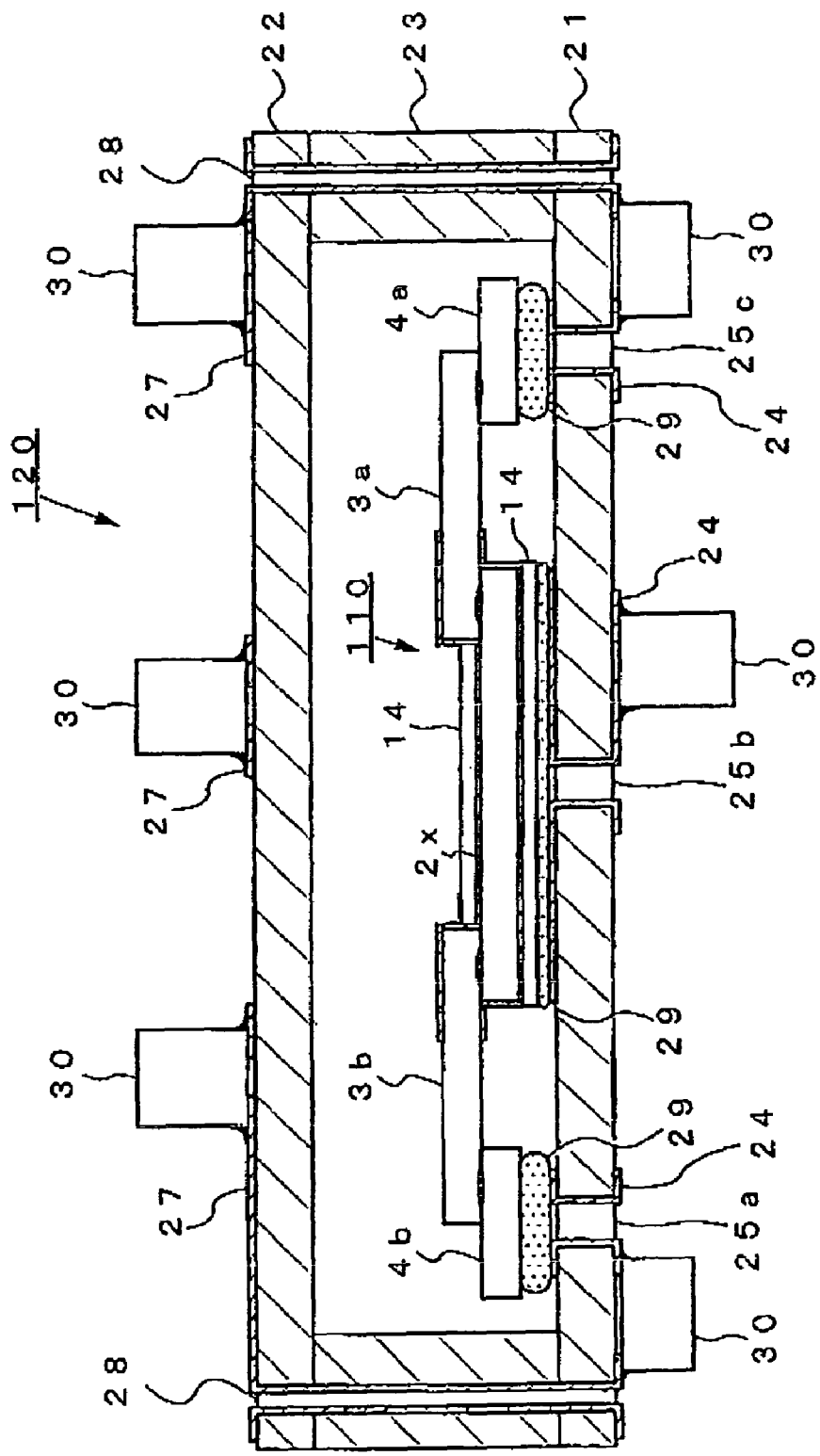
FIG. 5 is a schematic cross sectional view showing a circuit board having a built-in solid electrolytic capacitor.

FIG. 5 is a schematic cross sectional view showing a circuit board having a built-in solid electrolytic capacitor.

As shown in FIG. 5, a circuit board 120 having a built-in solid electrolytic capacitor includes a first insulating substrate 21 and a second insulating substrate 22 facing each other and the solid electrolytic capacitor component 110 between the first insulating substrate 21 and the second insulating substrate 22.

On the first insulating substrate 21, banks 23 each having a height larger than the thickness of the solid electrolytic capacitor component 110 are formed along two opposite side portions of the first insulating substrate 21 and the solid electrolytic capacitor component 110 is positioned at a predetermined position on one surface of the first insulating substrate 21 between the banks 23 and fixed using a conductive adhesive agent 29.

In this embodiment, the banks 23 are formed by punching out a substrate made of the same material as that used for forming the first insulating substrate 21 and the second insulating substrate 22 so that a portion having a predetermined area remains at the peripheral portion of the substrate to form a frame-like substrate and fixing the frame-like substrate onto the first insulating substrate 21 using an adhesive agent of the same material as that used for forming the first insulating substrate 21 and the second insulating substrate 22.

A wiring pattern 24 is formed on the other surface of the first insulating substrate 21 and a plurality of through-holes 25 are formed in the first insulating substrate 21 at positions corresponding to those of electrodes of a three-terminal type solid electrolytic capacitor to be mounted.

When the solid electrolytic capacitor component 110 is positioned at a predetermined position on one surface of the first insulating substrate 21 and fixed to the first insulating substrate 21 using a conductive adhesive agent 29, the plate-like second insulating substrate 22 is placed so as to abut against the banks 23 formed on the first insulating substrate 21.

Further, the first insulating substrate 21 and the second insulating substrate 22 are bonded to each other using an adhesive agent of the same material as that used for forming the first insulating substrate 21 and the second insulating substrate 22, whereby a circuit board 120 having a built-in solid electrolytic capacitor is fabricated.

A wiring pattern 27 is formed on the upper surface of the second insulating substrate 22 and a plurality of through-holes are formed in the second insulating substrate 22.

Electronic devices 30 are further mounted on the lower surface of the first insulating substrate 21 and the second insulating substrate 22 and contacts thereof are electrically connected to the wiring pattern 24, 27.

The first insulating substrate 21 is formed with through-holes 25a, 25b, 25c at positions corresponding to those of the foil-like copper substrates 4a, 4b serving an anode electrode of the solid electrolytic capacitor component 110 and the cathode electrode 14 of the solid electrolytic capacitor component 110, and the foil-like copper substrates 4a, 4b serving the anode electrode of the solid electrolytic capacitor component 110 and the cathode electrode 14 of the solid electrolytic capacitor component 110 can be seen by the eye via the through-holes 25a, 25b, 25c.

The anode electrode and the cathode electrode of the solid electrolytic capacitor component 110 are connected via the through-holes 25a, 25b, 25c to the wiring pattern 24b formed on the first insulating substrate 21 or the wiring pattern 27 formed on the second insulating substrate 22.

As described above, according to this embodiment, it is possible to fabricate a three-terminal type solid electrolytic capacitor component 110 having good electric characteristics and including the cathode lead electrode of the foil-like copper substrates 4a, 4b and the electrode body 100 formed by covering the surface of the foil-like aluminum substrate 2 whose surface is roughened with the aluminum oxide film. Further, since the solid electrolytic capacitor component is constituted as a three-terminal type solid electrolytic capacitor component, it is possible to reduce the ESL by dividing an electrical current path and obtain a solid electrolytic capacitor having good electric characteristics, i.e., whose initial characteristic values are good and do not vary substantially.

Since in the thus fabricated solid electrolytic capacitor, the thickness thereof can be sufficiently reduced, the solid electrolytic capacitor is suitable for being built in a circuit board and it is possible to fabricate a circuit board having a built-in solid electrolytic capacitor in a desired manner.

Further, according to this embodiment, since the banks 23 are provided on the first insulating substrate 21 and the solid electrolytic capacitor 10 is accommodated in the substantially closed space defined by the first insulating substrate 21, the banks 23 and the second insulating substrate 22 when the circuit board having a built-in solid electrolytic capacitor 120 is to be fabricated, excess pressure is not applied to the solid electrolytic capacitor when the second insulating substrate 22 is integrated with the solid electrolytic capacitor component 110 and the first insulating substrate 21 and it is therefore possible to reliably prevent the aluminum oxide film formed on the surface of the foil-like aluminum substrate 2 from being destroyed and aluminum serving as an anode electrode and the solid high molecular polymer electrolyte layer 11 from coming into contact with each other, whereby short circuit would occur when electrical current is applied to the solid electrolytic capacitor.

Figure 6:
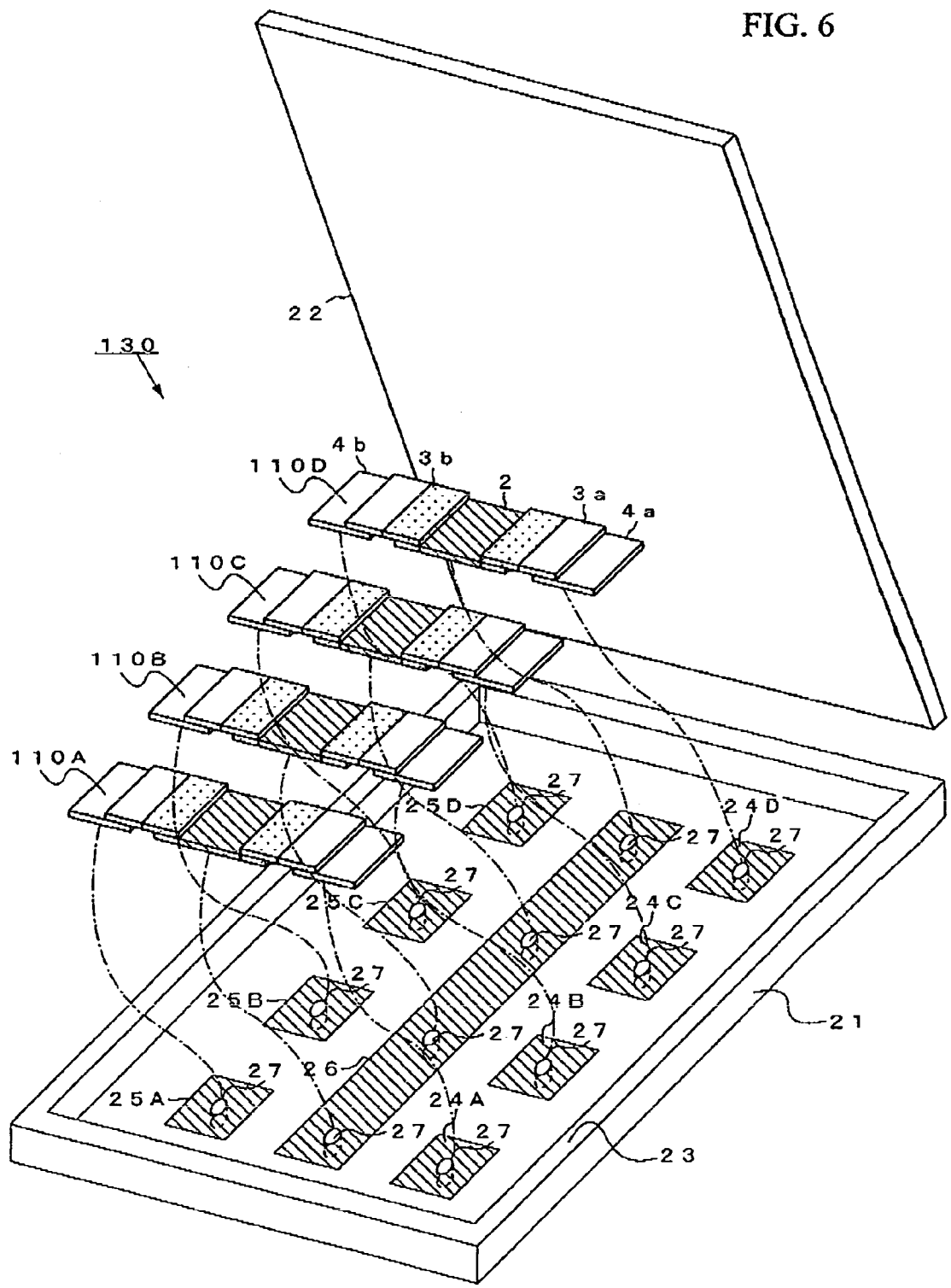
FIG. 6 is a schematic perspective view showing a circuit board in which a plurality of solid electrolytic capacitor components are built.

FIG. 6 is a schematic perspective view showing a circuit board in which a plurality of solid electrolytic capacitor components are built.

As shown in FIG. 6, a circuit board having a built-in solid electrolytic capacitor 130 includes a first insulating substrate 21 and a second insulating substrate 22 facing each other and four solid electrolytic capacitor components 110A to 110D between the first insulating substrate 21 and the second insulating substrate 22.

Banks 23 each having a height larger than the thickness of each of the solid electrolytic capacitor components 110A to 110D are formed along the periphery of the first insulating substrate 21 and the solid electrolytic capacitor components 110A to 110D are positioned at predetermined positions on wiring patterns formed on one surface of the first insulating substrate 21 between the banks 23 and fixed using a conductive adhesive agent 29.

On the one surface of the first insulating substrate 21, wiring patterns (lands) 24A to 24D, 25A to 25D and 26 are formed for mounting a solid electrolytic capacitor. At positions on which the solid electrolytic capacitor components 110A to 110D are to be mounted, the lands 24A to 24D corresponding to one of anode lead electrodes, the lands 25A to 25D corresponding to the other anode lead electrodes and the land 26 corresponding to cathode electrodes (conductive layer) are provided. The land 26 is formed as a wiring pattern to be connected to all cathode electrodes of the solid electrolytic capacitor components 110A to 110D.

Further, at positions of the first insulating substrate 21 where the lands 24A to 26 are formed, a plurality of through-holes 27 are formed, thereby ensuring the connection between the wiring patterns formed on the reverse surface of the first insulating substrate 21 and the lands. Therefore, it is possible to electrically connect the solid electrolytic capacitor components 110A to 110D with electronic devices mounted on the reverse surface of the first insulating substrate 21 via the through-holes 27 and the wiring patterns formed on the reverse surface of the first insulating substrate 21.

When the solid electrolytic capacitor components 110A to 110D are mounted, the conductive metal substrates 4a of the solid electrolytic capacitor components 110A to 110D are connected to the corresponding lands 24A to 24D, respectively, and the conductive metal substrates 4a of the solid electrolytic capacitor components 110A to 110D are connected to the corresponding lands 25A to 25D, respectively. Further, cathode electrodes of the solid electrolytic capacitor components 110A to 110D are connected to the land 26 common to all of them.

When the solid electrolytic capacitor components 110A to 110D are positioned at predetermined positions on the first insulating substrate 21 and fixed on the first insulating substrate 21 while the lands and the lead electrodes are electrically connected by solder or a conductive adhesive agent, the plate-like second insulating substrate 22 is placed so as to abut against the banks 23 formed on the first insulating substrate 21, and the first insulating substrate 21 and the second insulating substrate 22 are integrated using an adhesive agent or the like.

In the solid electrolytic capacitor components 110A to 110D mounted in this manner, the anode lead electrodes are provided independently of each other, while the cathode electrodes are short-circuited by the land 26. Therefore, all cathode electrodes of the solid electrolytic capacitor components 110A to 110D are electrically connected.

Therefore, it is possible, depending upon how an electronic circuit is constituted, to operate the solid electrolytic capacitor components independently or increase the capacitance and reduce the ESL of a solid electrolytic capacitor by connecting a plurality of solid electrolytic capacitor components in parallel. Therefore, the circuit board having a built-in solid electrolytic capacitor according to this embodiment is versatile.

In particular, in the case of connecting a plurality of solid electrolytic capacitors in parallel, since the capacitors built in the board apparently have many anode lead electrodes and have a multi-terminal structure, it is possible to markedly reduce the ESL and ESR by dividing electrical current paths.

Figure 7:
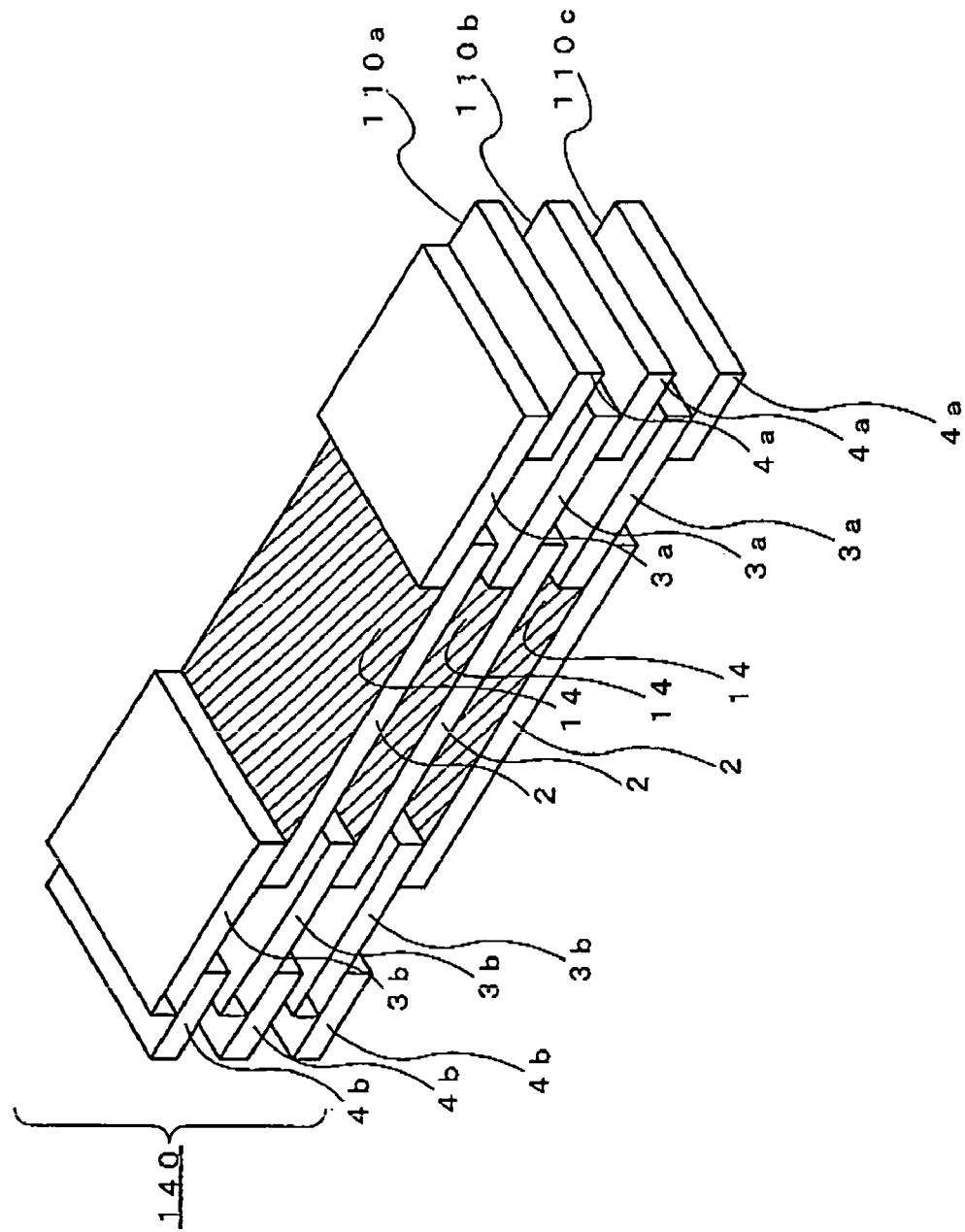
FIG. 7 is a schematic perspective view showing a solid electrolytic capacitor component which is another preferred embodiment of the present invention.
Figure 8:
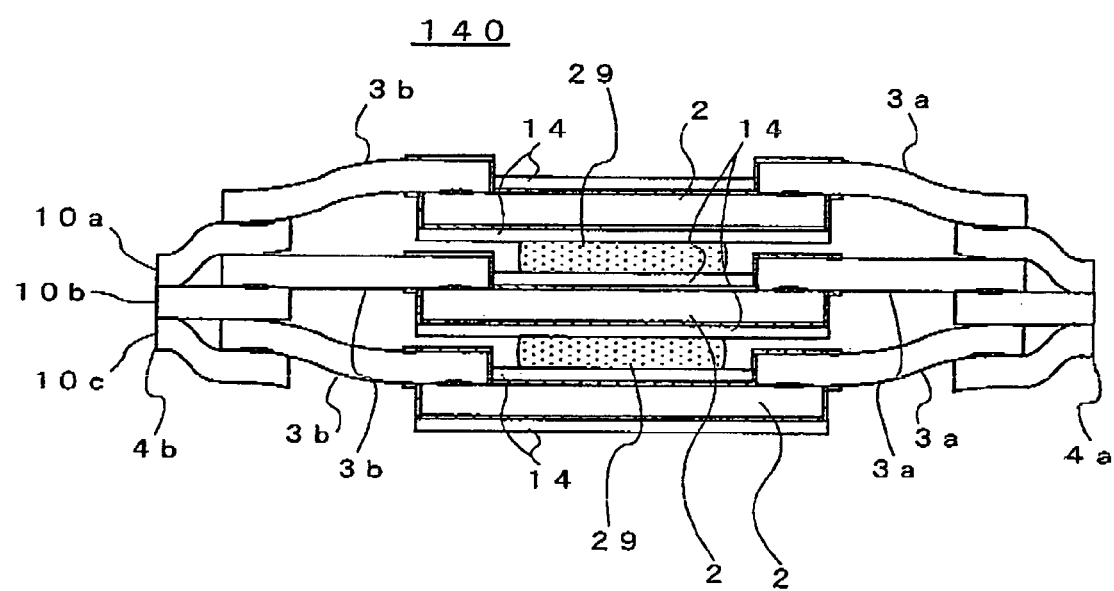
FIG. 8 is a schematic cross sectional view of a state where the solid electrolytic capacitor components are bonded to each other taken along a line B—B in FIG. 7.

FIG. 7 is a schematic perspective view showing a solid electrolytic capacitor component which is another preferred embodiment of the present invention and FIG. 8 is a schematic cross sectional view of a state where the solid electrolytic capacitor components are bonded to each other taken along a line B—B in FIG. 7.

As shown in FIGS. 7 and 8, a solid electrolytic capacitor component 140 has a structure constituted by layering three of the solid electrolytic capacitor components shown in FIG. 4. The solid electrolytic capacitor components 110a to 110c are electrically connected by adhering cathode electrodes thereof using a conductive adhesive agent 29 and bonding anode lead electrodes thereof by the ultrasonic welding. Therefore, although the thickness of the solid electrolytic capacitor component slightly increases, it is possible to provide a solid electrolytic capacitor component having electrostatic capacitance twice that of the solid electrolytic capacitor component shown in FIG. 4. Here, although explanation was made as to the solid electrolytic capacitor component obtained by layering three solid electrolytic capacitor components in this embodiment, the number of layered solid electrolytic capacitor components is not limited to three and the number thereof can be arbitrarily determined in accordance with electrostatic capacitance and the height required for a solid electrolytic capacitor component.

Next, a further preferred embodiment of the present invention will be explained.

Figure 9:
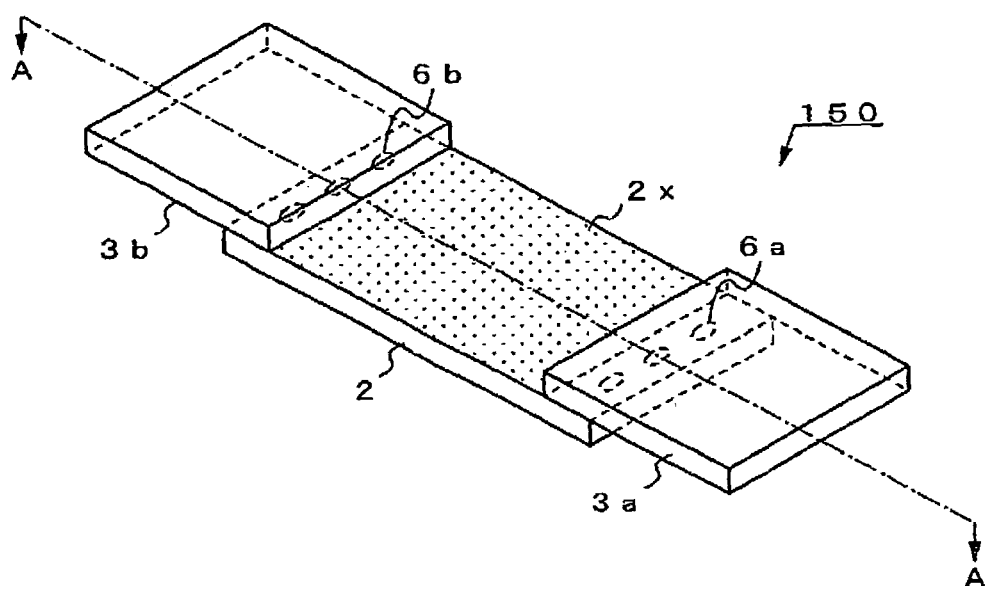
FIG. 9 is a schematic perspective view showing an electrode body for a solid electrolytic capacitor component (hereinafter sometimes simply referred to as an electrode) used for a solid electrolytic capacitor which is a further preferred embodiment of the present invention.
Figure 10:
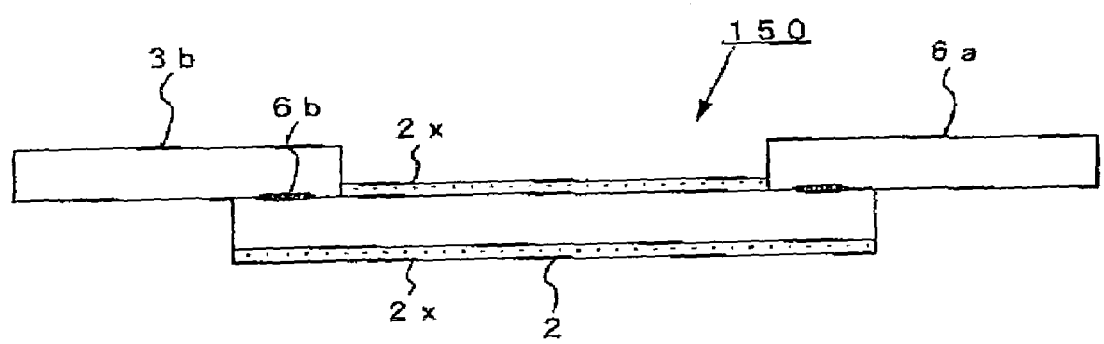
FIG. 10 is a schematic cross sectional view of an electrode body for a solid electrolytic capacitor component taken along a line A—A in FIG. 9.

FIG. 9 is a schematic perspective view showing an electrode body for a solid electrolytic capacitor component (hereinafter sometimes simply referred to as an electrode) used for a solid electrolytic capacitor which is a further preferred embodiment of the present invention and FIG. 10 is a schematic cross sectional view of an electrode body for a solid electrolytic capacitor component taken along a line A—A in FIG. 9.

In this embodiment, aluminum is used as a valve metal capable of forming an insulating oxide film and as shown in FIGS. 9 and 10, an electrode body 150 of a solid electrolytic capacitor according to this embodiment includes a foil-like aluminum substrate 2 whose surface is roughened (enlarged) and which is formed with an aluminum oxide film 2x on the surface thereof as an insulating oxide film and two foil-like aluminum substrates 3a, 3b whose surfaces are not roughened.

To one end portion region of the foil-like aluminum substrate 2 whose surface is roughened and which is formed with an aluminum oxide film 2x on the surface thereof, one end portion region of the foil-like aluminum substrates 3a whose surface is not roughened is bonded by ultrasonic welding so as to establish electrical connection between the valve metals. Further, to the other end portion region of the foil-like aluminum substrate 2 whose surface is roughened and which is formed with an aluminum oxide film 2x on the surface thereof, one end portion region of the foil-like aluminum substrates 3b whose surface is not roughened is bonded by ultrasonic welding so as to establish electrical connection between the valve metals.

When the electrode body 150 is to be formed, the foil-like aluminum substrate 2 is first cut from an aluminum foil sheet whose surface is roughened (enlarged) and which is formed with an aluminum oxide film on the surface thereof so as to have a predetermined size. Further, two foil-like aluminum substrates 3a, 3b are cut from an aluminum foil sheet whose surface is not roughened so as to have a predetermined size. Then, each of one end portion regions of the foil-like aluminum substrate 3a, 3b whose surfaces are not roughened are superposed on the opposite end portion regions of the foil-like aluminum substrate 2 whose surface is roughened in such a manner that end portion regions thereof having predetermined areas are overlapped.

Then, the end portion region of the foil-like aluminum substrate 2 whose surface is roughened and each of the one end portion regions of the foil-like aluminum substrates 3a, 3b whose surfaces are not roughened superposed on each other are bonded by ultrasonic welding, thereby forming a welding connected portion 4a or 4b. The aluminum oxide film formed on the surface of the foil-like aluminum substrate 2 is removed by bonding the end portion region of the foil-like aluminum substrate 2 and the end portion region of each of the foil-like aluminum substrates 3a and 3b by ultrasonic welding, whereby metal of the end portion region of foil-like aluminum substrate 2 whose surface is roughened and metal of the end portion region of the foil-like aluminum substrate 3a or 3b whose surface is not roughened are electrically connected. The areas of the end portion region of the foil-like aluminum substrate 3a or 3b and the end portion region of the foil-like aluminum substrate 2 to be superposed are determined so that the connected portion can have a predetermined strength.

Since the foil-like aluminum substrate 2 whose surface is roughened and which is formed with the aluminum oxide film 2x on the surface thereof is cut from an aluminum foil sheet, no aluminum oxide film which is a dielectric material is formed on an edge portion thereof and, therefore, it is required to form an aluminum oxide film on an edge portion of the foil-like aluminum substrate 2 whose surface is roughened by anodic oxidation in order to use the thus formed electrode body 100 as an anodic electrode of a solid electrolytic capacitor.

Figure 11:
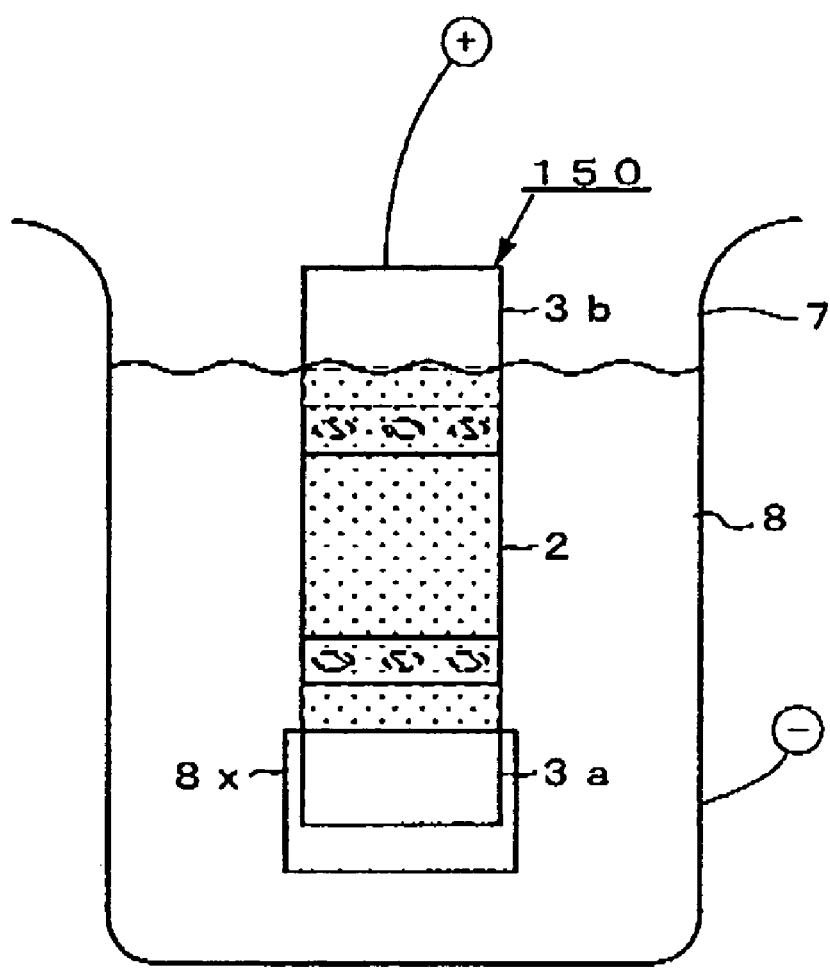
FIG. 11 is a schematic cross sectional view showing an anodic oxidization method for forming an aluminum oxide film on an edge portion of a foil-like aluminum substrate 2 whose surface is roughened.

FIG. 11 is a schematic cross sectional view showing an anodic oxidation method for forming an aluminum oxide film on an edge portion of the foil-like aluminum substrate 2 whose surface is roughened.

As shown in FIG. 11, a part of the foil-like aluminum substrate 3a whose surface is not roughened and which is not superposed on the foil-like aluminum substrate 2 whose surface is roughened is first masked with thermosetting resist 8x. Then, the electrode body 150 is set in a forming solution 8 consisting of an ammonium adipate solution accommodated in a beaker made of stainless steel in such a manner that the whole foil-like aluminum substrate 2 whose surface is roughened, the whole foil-like aluminum substrate 3a which is mask-processed and a part of foil-like aluminum substrate 3b which is not mask-processed are immersed in the forming solution 8 and voltage is applied with the foil-like aluminum substrate 3b whose surface is not roughened is connected to the plus side and the beaker 7 made of stainless steel is connected to the minus side.

The applied voltage can be determined in accordance with the thickness of the aluminum oxide film to be formed and when an aluminum oxide film having a thickness of 10 nm to 1 $\mu$m is to be formed, the applied voltage is normally determined to be several volts to about twenty volts.

As a result, anodic oxidation is started. Although the forming solution 8 moves upward during the anodic oxidation operation since the surface of the foil-like aluminum substrate 2 is roughened, it does not move upward beyond the connected portion of the foil-like aluminum substrate 2 whose surface is roughened and the foil-like aluminum substrate 3b whose surface is not roughened since the surface of the foil-like aluminum substrate 3b is not roughened. Further, since the part of the foil-like aluminum substrate 3a whose surface is not roughened is masked with thermosetting resist 8x, it do not come into contact with the forming solution 8.

Therefore, it is possible to reliably prevent the forming solution from coming into contact with the tip end portion regions of the foil-like aluminum substrates 3a, 3b whose surfaces are not roughened and an aluminum oxide film is formed on only the whole surface region of the foil-like aluminum substrate 2 whose surface is roughened including the edge portion region thereof and a region of a part of the foil-like aluminum substrates 3a and 3b whose surfaces are not roughened and which are connected to the foil-like aluminum substrate 2 whose surface is roughened.

On the whole surface of the foil-like aluminum substrate 2 whose surface is roughened and which is formed with the aluminum oxide film on the surface thereof of the thus fabricated electrode body 100, a cathode electrode of conductive high molecular polymer or the like is formed by a well known process, thereby fabricating a solid electrolytic capacitor component.

Figure 12:
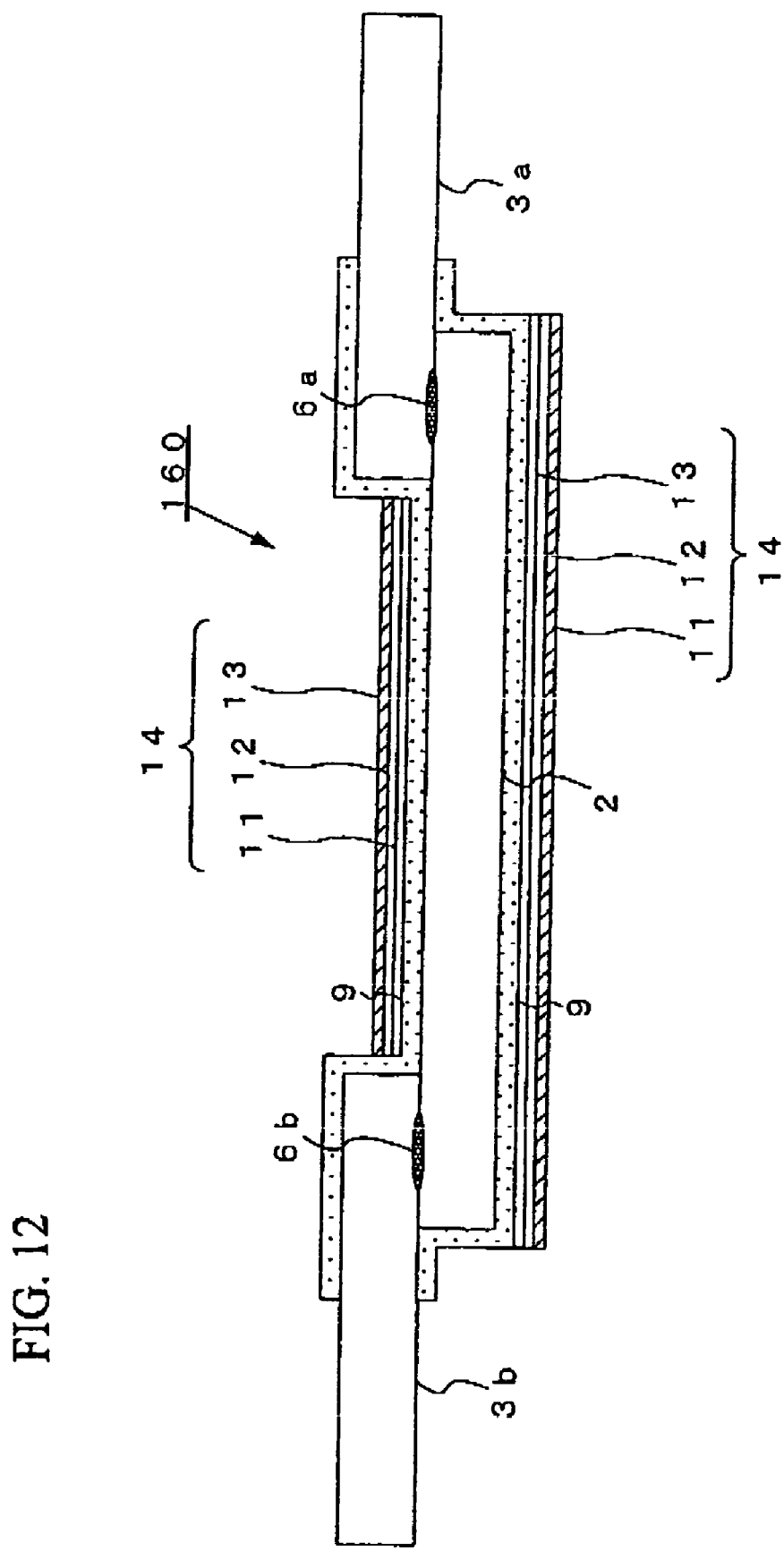
FIG. 12 is a schematic cross sectional view showing a solid electrolytic capacitor component.

FIG. 12 is a schematic cross sectional view showing a solid electrolytic capacitor component.

As shown in FIG. 12, the solid electrolytic capacitor component 160 includes a cathode electrode 14 formed by laminating a solid high molecular polymer electrolyte layer 11, a graphite paste layer 12 and a silver paste layer 13 on the substantially whole surface of the foil-like aluminum substrate 2 whose surface is roughened and which is formed with the aluminum oxide film 9.

The solid high molecular polymer electrolyte layer 11 containing conductive high molecular polymer is formed by chemical oxidation polymerization or electrolytic oxidation polymerization on the substantially whole surface of the foil-like aluminum substrate 2 whose surface is roughened and which is formed with the aluminum oxide film 9, and the graphite paste layer 12 and the silver paste layer 13 are formed on the solid high molecular polymer electrolyte layer 11 by the screen printing method or the spray coating method.

After removing the mask of thermosetting resist 8x, a plurality of the thus fabricated solid electrolytic capacitor components 160 are mounted on a lead frame and connected to an anode lead electrode and a cathode lead electrode formed on the lead frame in advance. Thereafter, they are molded, whereby a discrete-type solid electrolytic capacitor is fabricated.

Figure 13:
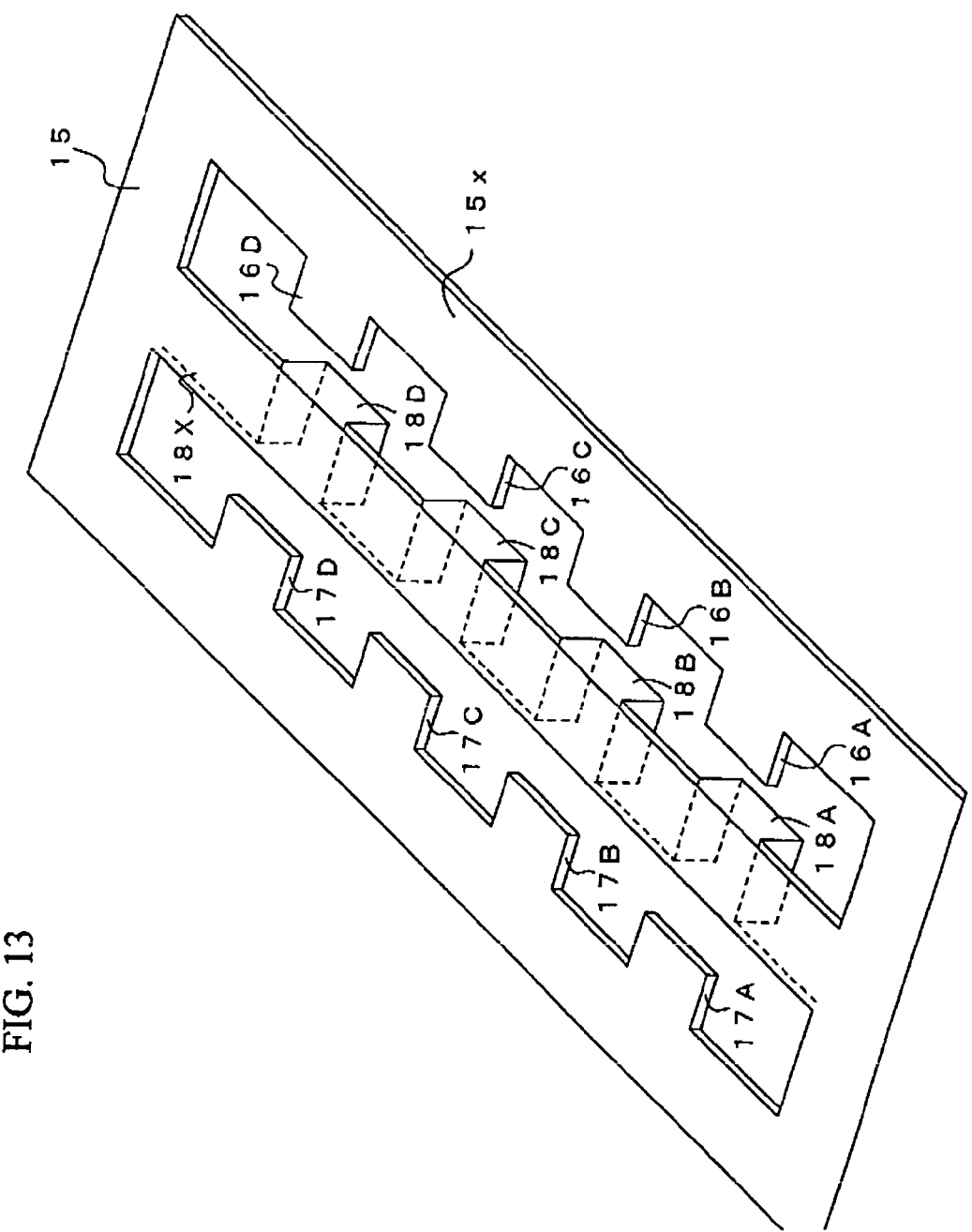
FIG. 13 is a schematic perspective view showing the structure of a lead frame.
Figure 14:
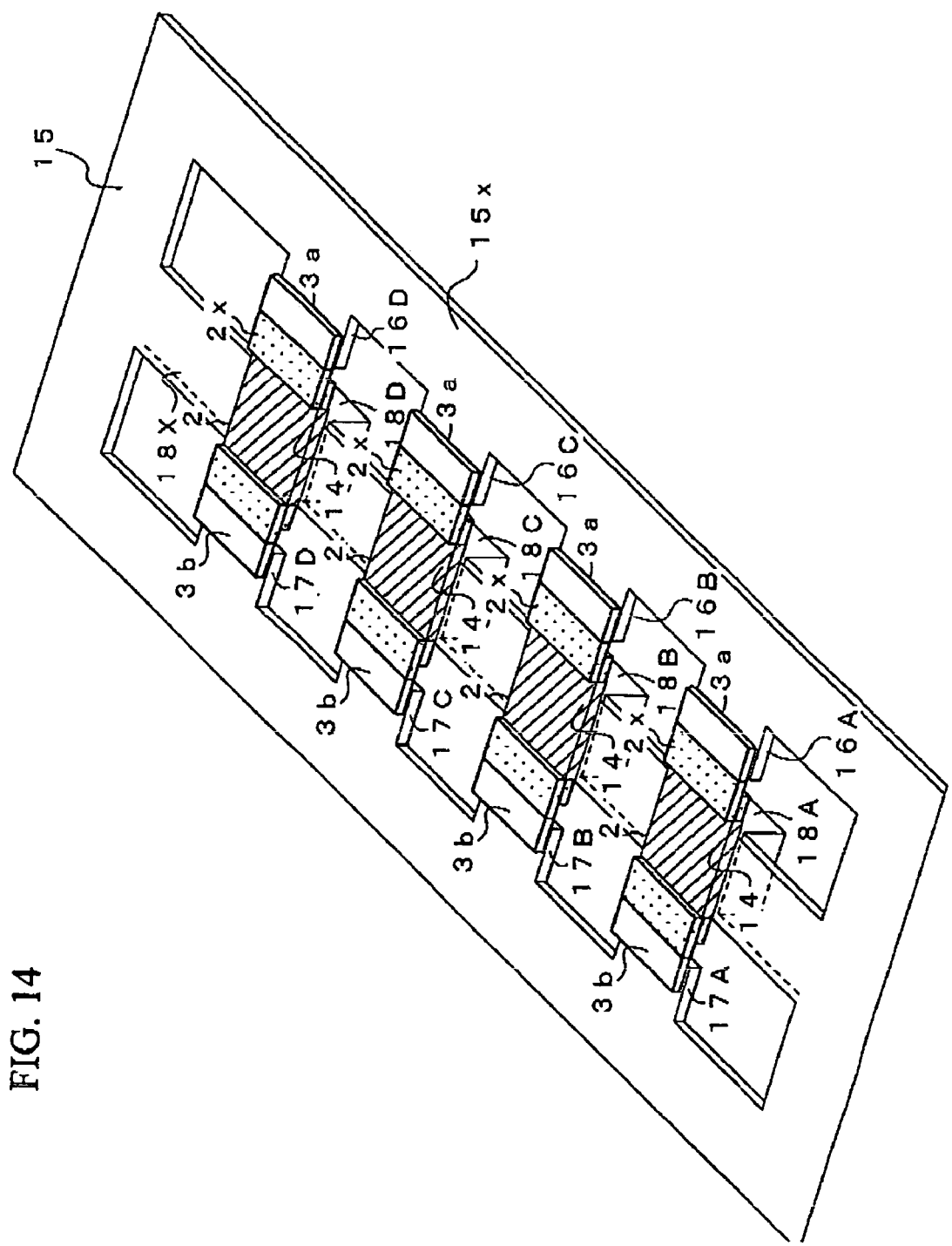
FIG. 14 is a schematic perspective view showing a plurality of solid electrolytic capacitor components mounted on a lead frame.

FIG. 13 is a schematic perspective view showing the structure of a lead frame and FIG. 14 is a schematic perspective view showing a plurality of solid electrolytic capacitor components mounted on a lead frame.

As shown in FIGS. 13 and 14, the lead frame 15 is fabricated by punching out a phosphor bronze substrate so as to have a predetermined size for mounting four solid electrolytic capacitor components thereon. A center frame 18X is provided at the central portion of a main frame 15X located at the circumferential portion of the lead frame and the center frame 18 X is formed with cathode lead portions 18A to 18D projecting downward and spaced by a predetermined distance. Further, in a direction perpendicular to the center frame 18X, two anode lead portions 16A and 17A projecting from the main frame 15X toward the cathode lead portion 18A, two anode lead portions 16B and 17B projecting from the main frame 15X toward the cathode lead portion 18B, two anode lead portions 16C and 17C projecting from the main frame 15X toward the cathode lead portion 18C and two anode lead portions 16D and 17D projecting from the main frame 15X toward the cathode lead portion 18D are provided.

The four solid electrolytic capacitor components 10A to 10D are mounted at predetermined positions on the lead frame 15 and adhered thereto using a silver system adhesive agent so that paste layers (conductive layers) 14A to 14D of the solid electrolytic capacitor components 10A to 10D serving as cathode electrodes can be respectively electrically connected to the cathode lead portions 18A to 18D formed in the lead frame 15 in advance, thereby being fixed to the lead frame 15. Further, end portion regions of the foil-like aluminum substrates 3a, 3b whose surfaces are not roughened are superposed on the anode lead portions 16A to 16D and 17A to 17D formed in the lead frame 15 in advance and welded using a laser spot welding machine to be bonded to end portion regions of the anode lead portions 16, 17.

Figure 15:
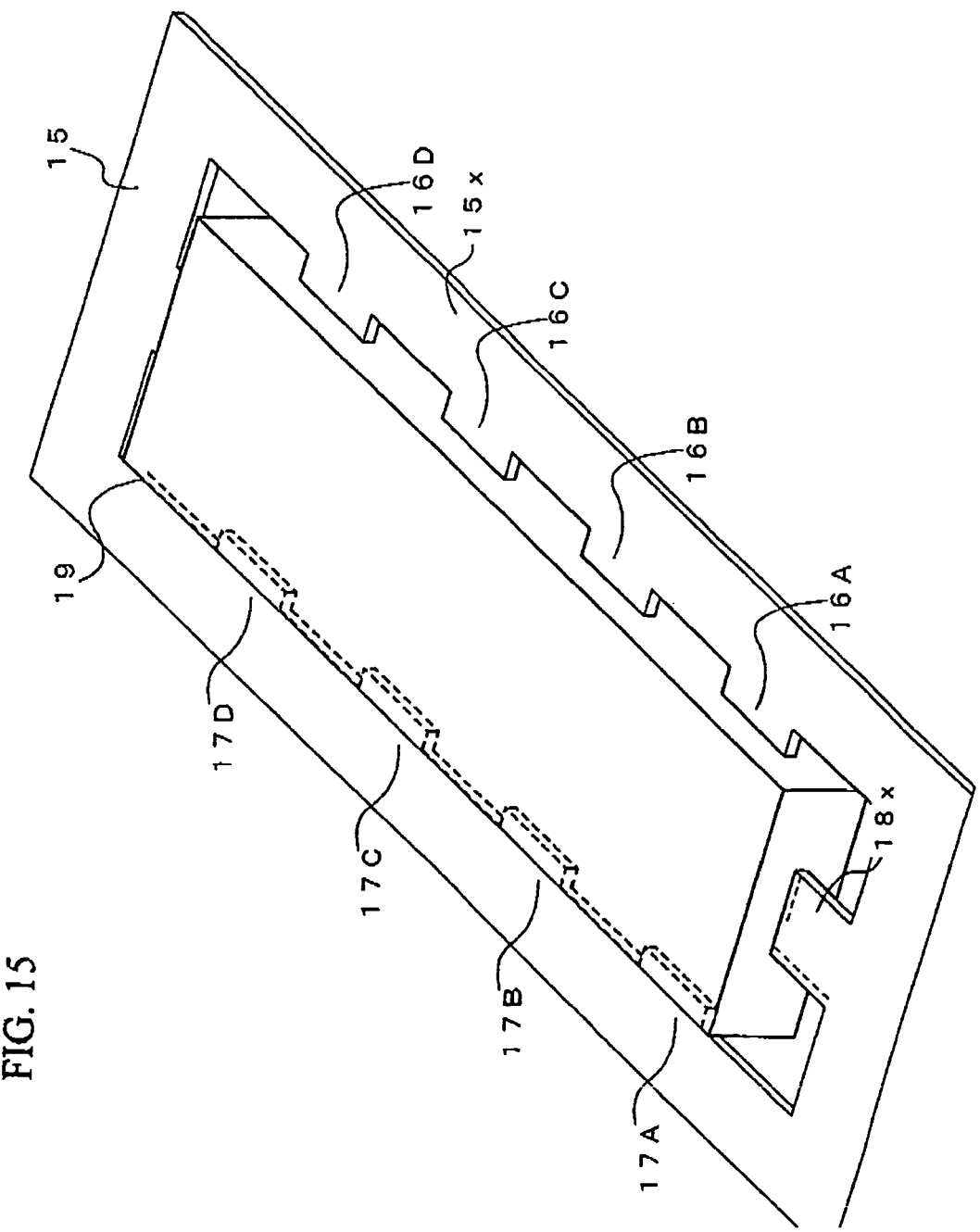
FIG. 15 is a schematic perspective view showing molded solid electrolytic capacitor components.

FIG. 15 is a schematic perspective view showing molded solid electrolytic capacitor components.

As shown in FIG. 15, after each of the solid electrolytic capacitor components has been fixed to the lead frame 15, it is molded with epoxy resin 19 by injection molding or transfer molding so that parts of the cathode lead portions 18 are exposed from the bottom portion of the mold and are utilized as the cathode lead electrodes.

Figure 16:
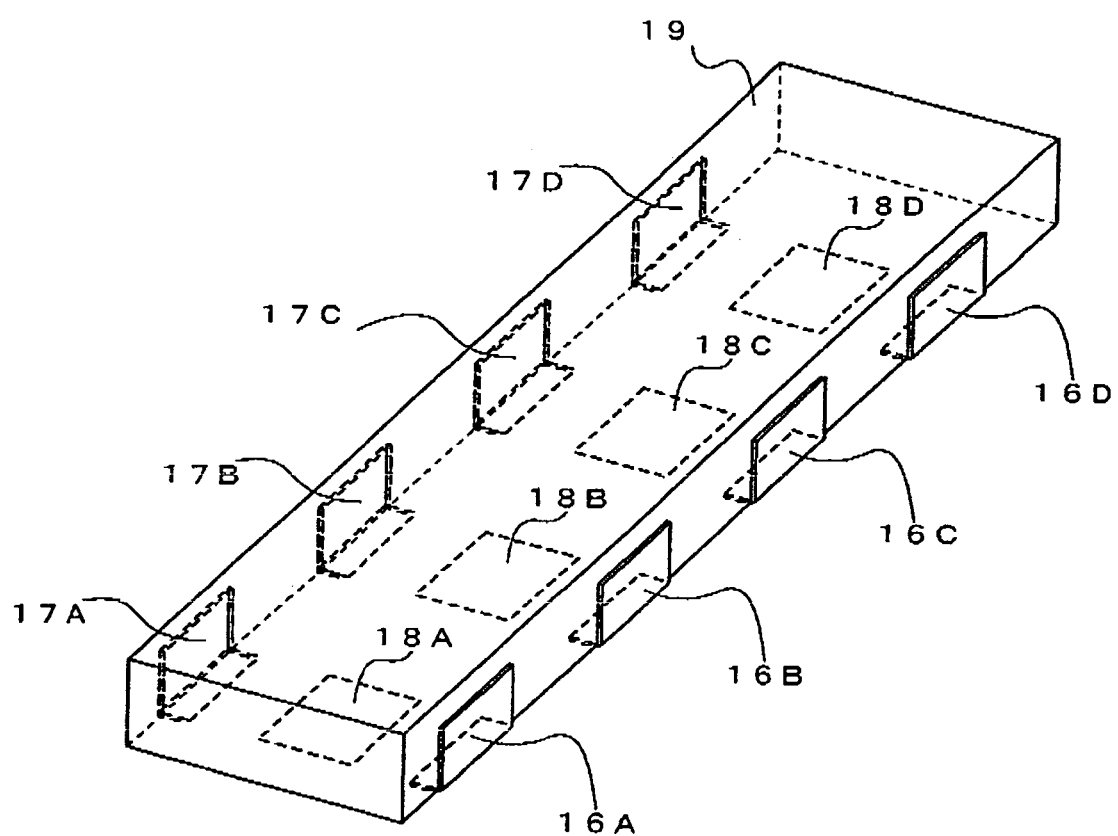
FIG. 16 is a schematic perspective view showing a molded solid electrolytic capacitor after removal from a lead frame wherein solid electrolytic capacitor components disposed inside of the solid electrolytic capacitor are omitted.

FIG. 16 is a schematic perspective view showing a molded solid electrolytic capacitor after removal from a lead frame wherein solid electrolytic capacitor components disposed inside of the solid electrolytic capacitor are omitted.

As shown in FIG. 16, a solid electrolytic capacitor molded with epoxy resin 19 is removed from the lead frame and the anode lead portions are folded, thereby forming the anode lead electrodes 16, 17.

Further, the cathode lead portions 18 are exposed from the bottom portion of the mold, thereby forming the cathode lead electrodes 18.

In the thus constituted solid electrolytic capacitor components 10A to 10D, the anode lead electrodes 16A to 16D and 17A to 17D are provided independently of each other, while the cathode lead electrodes 18A to 18D are integrated with each other by a support portion 18X common to them to be short-circuited. Therefore, all of the cathode electrodes of the solid electrolytic capacitor components are electrically connected.

As described above, since the anode lead electrode is formed by bonding one end portion region of each of the foil-like aluminum substrates 3a, 3b whose surfaces are not roughened to the opposite end portion regions of the foil-like aluminum substrate 2 whose surface is roughened and covered with the aluminum oxide film and bonding the copper substrates 16, 17 to the other end portion region of each of the foil-like aluminum substrates 3a, 3b, it is possible to fabricate a solid electrolytic capacitor 10 having good electric characteristics.

Further, since each of the solid electrolytic capacitor components is constituted as a three-terminal type solid electrolytic capacitor component, it is possible to reduce the ESL by dividing an electrical current path and obtain a solid electrolytic capacitor having good electric characteristics, i.e., whose initial characteristic values are good and do not vary substantially.

Moreover, since the cathode lead electrodes of solid electrolytic capacitor components are common in a discrete-type solid electrolytic capacitor fabricated by array-like disposing a plurality of three-terminal type solid electrolytic capacitor components, it is possible, depending upon how an electronic circuit is constituted, to operate the solid electrolytic capacitor components independently or increase the capacitance and reduce the ESL of a solid electrolytic capacitor by connecting a plurality of solid electrolytic capacitor components in parallel. Therefore, the circuit board having a built-in solid electrolytic capacitor according to this embodiment is versatile.

In particular, in the case of connecting a plurality of solid electrolytic capacitors in parallel, since the capacitors in the mold have many anode lead electrodes and have a multi-terminal structure, it is possible to markedly reduce the ESL and ESR by dividing electrical current paths.

Furthermore, it is possible to obtain a solid electrolytic capacitor component having large capacitance by layering a plurality of the solid electrolytic capacitor components shown in FIG. 12. In such a case, the cathode electrodes 14 are adhered to each other by a conductive adhesive agent and the tip end portion regions of the foil-like aluminum substrates are bonded to each other by ultrasonic welding or the like. If the thus constituted solid electrolytic capacitor component is mounted on the lead frame shown in FIG. 11, it is possible to obtain a discrete-type solid electrolytic capacitor having still larger capacitance.

Hereinafter, working examples and comparative examples will be set out in order to further clarify the advantages of the present invention.

WORKING EXAMPLE 1

A solid electrolytic capacitor including a solid high molecular polymer electrolyte layer was prepared in the following manner.

A copper foil cut from a copper foil sheet so as to have a size of 0.5 cm×1 cm and a thickness of 60 μm and an aluminum foil whose surface was not roughened cut from an aluminum foil sheet so as to have a size of 1 cm×1 cm and a thickness of 60 μm were superposed in such a manner that one end portion regions thereof were overlapped by 1 mm and the superposed portions thereof were bonded and electrically connected using a "40 kHz-Ultrasonic Welding Machine" manufactured by Branson Ultrasonics Division of Emerson Japan Limited, thereby forming a connected body of the copper foil and the aluminum foil whose surface was not roughened. Thus, two of the connected bodies were fabricated.

An aluminum foil was cut from the sheet of an aluminum foil having a thickness of 100 μm which was formed with an aluminum oxide film on the surface thereof and whose surface was roughened so as to have a size of 1 cm×1.5 cm and was superposed on the connected body of the copper foil and the aluminum foil whose surface was not roughened in such a manner that an end portion region thereof and the other end portion region of the aluminum foil whose surface was not roughened were overlapped by 1 mm. Then, the end portion regions overlapped with each other were bonded and electrically connected using the ultrasonic welding machine, thereby forming an electrode body for a three-terminal type solid electrolytic capacitor component including the copper foil, the aluminum foil whose surface was not roughened, the aluminum foil whose surface was roughened and the copper foil in this order.

Of the copper foil and the aluminum foil whose surface was not roughened formed at opposite end portions in the thus fabricated electrode body for a three-terminal type solid electrolytic capacitor component, only one end portion region of each of them was coated with resist. However, no resist was applied to a portion where a part of the aluminum foil whose surface was not roughened and the aluminum foil whose surface was roughened were bonded.

Further, the thus fabricated electrode body was set in an aqueous solution of ammonium adipate prepared to have a concentration of 7% by weight, pH 6.0 so that the aluminum foil whose surface was formed with an aluminum oxide film and roughened was completely immersed therein. At this time, of the two aluminum foils whose surfaces were not roughened, a part of the aluminum foil which was not coated with resist was immersed in the aqueous solution of ammonium adipate but, of the two copper foils, the copper foil which was not coated with resist was not brought into contact with the aqueous solution of ammonium adipate.

An aluminum oxide film was then formed by connecting the copper foil of the electrode body, which was not coated with resist to an anode, oxidizing the surface of the aluminum foil immersed in the aqueous solution of ammonium adipate under the condition that a forming current density was set at 50 to 100 mA/cm2 and a forming voltage was set equal to or lower than 35 volts.

Thereafter, the electrode body was extracted from the aqueous solution of ammonium adipate and a solid high molecular polymer electrolyte layer containing polypyrrol was formed by chemical oxidization polymerization on the surface of the aluminum foil of the anodic electrode which was roughened. More specifically, the electrode body was set in a cell of a mixing solution of ethanol and water containing 0.1 mol/liter of pyrrol monomer purified by distillation, 0.1 mol/liter of alkylnaphthalene sodium sulfonate and 0.05 mol/liter of ferrous sulphate (III) so that only the aluminum foil whose surface was roughened and which was formed with the aluminum oxide film was immersed therein and the solution was agitated for thirty minutes, thereby performing chemical oxidization polymerization. The same operation was repeated three times and as a result, a solid high molecular polymer electrolyte layer having a thickness of about 50 $\mu$m was formed.

Carbon paste was coated on the surface of the thus obtained solid high molecular polymer electrolyte layer and silver paste was further coated on the carbon paste, thereby forming a cathode electrode. After the paste layers were formed, the resist layer was dissolved with an organic solvent, thereby removing the resist layer and portions of the aluminum foil whose surface was not roughened and the copper foil were exposed. Thus, a three-terminal type solid electrolytic capacitor component was fabricated.

On the other hand, two epoxy resin insulating substrates each having copper foils having a thickness of 18 $\mu$m and adhered to the opposite surfaces thereof, a thickness of 0.5 mm and a size of 2 cm×4.5 cm and containing glass cloth were prepared in the following manner.

A part of the copper foil was removed by a chemical etching process from the copper foil surface for forming an electrical circuit and a predetermined wiring pattern was formed. Here, the surface of the substrate on which a solid electrolytic capacitor was to be mounted was patterned with resist and chemical etching was effected thereon so as to remove all copper foil from portions where copper foil was not needed to be present.

Further, through-holes were formed in one of the glass cloth containing epoxy resin insulating substrates at positions corresponding to two anode lead electrodes and a cathode electrodes of a solid electrolytic capacitor to be built in. Then, a nickel plating layer having a thickness of 3 $\mu$m was formed using the electroless nickel plating process on the through-holes and copper patterns and a gold plating layer having a thickness of 0.08 $\mu$m was further formed on the nickel plating layer.

Similarly, through-holes used for electronic devices to be mounted were formed in the other glass cloth containing epoxy resin insulating substrate.

On the other hand, a substrate formed of glass cloth containing epoxy resin and having a thickness of 200 $\mu$m was fabricated so as to have a size of 2 cm×4.5 cm and the inner region thereof was punched out so that a region having a width of 3 mm remained, thereby fabricating the substrate for a bank.

Further, two epoxy pre-pregs each formed of glass cloth containing epoxy resin and having a thickness of 50 $\mu$m were fabricated so that each had a size of 2 cm×4.5 cm and the inner region of each epoxy pre-preg was punched out so that a region having a width of 3 mm remained, thereby fabricating two substrates for banks.

The substrate for a bank fabricated by removing the inner region thereof by punch out and the surface of one of the glass cloth containing epoxy resin insulating substrates from which the copper foil was removed were brought into close contact with each other via one of the thus processed epoxy pre-pregs having the thickness of 50 $\mu$m and maintained using a vacuum hot press apparatus at 175° C. under pressure and then under a reduced pressure for 40 minutes, thereby curing the epoxy pre-preg and the glass cloth containing epoxy resin insulating substrate and the substrate whose inner region was removed were fixed. Thus, an insulating substrate having a concave space was fabricated.

The solid electrolytic capacitor component was fixed using a silver-epoxy system adhesive agent onto the surface of the insulating substrate having a concave space so that the two anode lead electrodes and the cathode electrode of the three-terminal type solid electrolytic capacitor component were disposed at positions corresponding to the through-holes formed in the insulating substrate.

Then, the other glass cloth containing epoxy resin insulating substrate was superposed on and brought into close contact with the glass cloth containing epoxy resin insulating substrate onto which the three-terminal type solid electrolytic capacitor component was fixed via the other epoxy pre-preg having the thickness of 50 $\mu$m fabricated in the above described manner so that the solid electrolytic capacitor component was accommodated within the concave space.

The thus contacted glass cloth containing epoxy resin insulating substrates were maintained using the vacuum hot press apparatus at 175° C. under pressure and then under a reduced pressure for 40 minutes, thereby curing the epoxy pre-preg and the two glass cloth containing epoxy resin insulating substrates were fixed to each other.

After the glass cloth containing epoxy resin insulating substrates were cooled, the wiring patterns formed on the surfaces of the glass cloth containing epoxy resin insulating substrates and portions of the through-holes at which the solid electrolytic capacitor component was accommodated were electrically connected using a conductive adhesive agent, solder or the like via the through-holes formed in the glass cloth containing epoxy resin insulating substrates and electronic devices or the like. Thus, a circuit board sample #1 having a built-in solid electrolytic capacitor was obtained.

Electrostatic capacitance and the $S_{12}$ characteristic of the thus fabricated circuit board sample #1 having a built-in solid electrolytic capacitor were measured using an "Impedance Analyzer 4294A" and a "Net Work Analyzer 8753D" manufactured by Agilent Technologies. Then, equivalent circuit simulation was performed based on the thus measured $S_{12}$ characteristic, thereby determining an ESR value and an ESL value.

The result was that the electrostatic capacitance of the circuit board sample #1 having a built-in solid electrolytic capacitor at 120 Hz was 150 pF, the ESR value thereof at 100 kHz was 25 m$\Omega$ and the ESL value thereof at 100 kHz was 15 pH.

Further, the circuit board sample #1 having a built-in solid electrolytic capacitor was held at a high temperature of 125° C. for 1000 hours and the electric characteristics thereof were estimated similarly to the above.

The result was that, the electrostatic capacitance of the circuit board sample #1 having a built-in solid electrolytic capacitor at 120 Hz was 145 µF, the ESR value thereof at 100 kHz was 27 mΩ and the ESL value thereof at 100 kHz was 16 pH.

WORKING EXAMPLE 2

Similarly to in Working Example 1, three three-terminal type solid electrolytic capacitors were fabricated.

The three solid electrolytic capacitors were superposed on each other so that one of the anode lead electrodes, the cathode electrode formed with the paste layers (conductive layers) and the other anode lead electrode of the three-terminal type solid electrolytic capacitors were overlapped. The cathode electrodes were integrated with each other using a silver system conductive adhesive agent and the pair of anode lead electrodes were integrated with each other using a "YAG Laser Spot Welding Machine" manufactured by NEC Corporation.

In this manner, a solid electrolytic capacitor unit including the laminated three three-terminal type solid electrolytic capacitors was fabricated.

Further, similarly to in Working Example 1, two glass cloth containing epoxy resin insulating substrates were fabricated.

On the other hand, two substrates each formed of glass cloth containing epoxy resin and having a thickness of 200 µm were fabricated so that each of them had a size of 2 cm×4.5 cm and the inner region of each of them was punched out so that a region having a width of 3 mm remained, thereby fabricating two substrates for banks.

Further, three epoxy pre-pregs each formed of glass cloth containing epoxy resin and having a thickness of 50 µm were fabricated so that each had a size of 2 cm×4.5 cm and the inner region of each epoxy pre-preg was punched out so that a region having a width of 3 mm remained, thereby fabricating a first epoxy pre-preg, a second epoxy pre-preg and a third epoxy pre-preg.

One of the substrates for banks fabricated by removing the inner region thereof by punch out and the surface of one of the glass cloth containing epoxy resin insulating substrates from which the copper foil was removed were brought into close contact with each other via the first epoxy pre-pregs having the thickness of 50 µm and maintained using a vacuum hot press apparatus at 175° C. under pressure and then under a reduced pressure for 40 minutes, thereby curing the epoxy pre-preg and the glass cloth containing epoxy resin insulating substrate and the substrate whose inner region was removed were fixed. Thus, a first insulating substrate having a concave space was fabricated.

Similarly to the above, the other substrates for a bank fabricated by removing the inner region thereof by punch out and the surface of the other glass cloth containing epoxy resin insulating substrate from which the copper foil was removed were brought into close contact with each other via the second epoxy pre-pregs having the thickness of 50 µm and maintained using a vacuum hot press apparatus at 175° C. under pressure and then under a reduced pressure for 40 minutes, thereby curing the epoxy pre-preg and the glass cloth containing epoxy resin insulating substrate and the other substrate for a bank were fixed. Thus, a second insulating substrate having a concave space was fabricated.

In the concave space of the thus fabricated first insulating substrate, solid electrolytic capacitor component was fixed using a silver-epoxy system adhesive agent so that the two anode lead electrodes and the cathode electrode of the three-terminal type solid electrolytic capacitor component were disposed at positions corresponding to the through-holes formed in the first insulating substrate.

Then, the second insulating substrate was superposed on and brought into close contact with the first insulating substrate onto which the three-terminal type solid electrolytic capacitor component was fixed via the third epoxy pre-preg having the thickness of 50 µm fabricated in the above described manner so that the concave spaces of the first and second insulating substrates faced each other and the solid electrolytic capacitor component was accommodated within the concave spaces.

The thus contacted insulating substrates were maintained using the vacuum hot press apparatus at 175° C. under pressure and then under a reduced pressure for 40 minutes, thereby curing the epoxy pre-preg and the two glass cloth containing epoxy resin insulating substrates were fixed to each other.

After the glass cloth containing epoxy resin insulating substrates were cooled, the wiring patterns formed on the surfaces of the glass cloth containing epoxy resin insulating substrates and portions of the through-holes at which the solid electrolytic capacitor component was accommodated were electrically connected using a conductive adhesive agent, solder or the like via the through-holes formed in the glass cloth containing epoxy resin insulating substrates and electronic devices or the like. Thus, a circuit board sample #2 having a built-in solid electrolytic capacitor was obtained.

Electric characteristics of the thus fabricated circuit board sample #2 having a built-in solid electrolytic capacitor were estimated similarly to in Working Example 1.

The result was that the electrostatic capacitance of the circuit board sample #2 having a built-in solid electrolytic capacitor at 120 Hz was 455 pF, the ESR value thereof at 100 kHz was 10 mΩ and the ESL value thereof at 100 kHz was 12 pH.

Further, the circuit board sample #2 having a built-in solid electrolytic capacitor was held at a high temperature of 125° C. for 1000 hours and the electric characteristics thereof were estimated similarly to the above.

The result was that the electrostatic capacitance of the circuit board sample #2 having a built-in solid electrolytic capacitor at 120 Hz was 450 µF, the ESR value thereof at 100 kHz was 11 mΩ and the ESL value thereof at 100 kHz was 12 pH.

COMPARATIVE EXAMPLE 1

A copper foil cut from a copper foil sheet so as to have a size of 0.5 cm×1 cm and a thickness of 60 µm and an aluminum foil whose surface was not roughened cut from an aluminum foil sheet so as to have a size of 1 cm×1 cm and a thickness of 60 µm were superposed in such a manner that one end portion regions thereof were overlapped by 1 mm and the superposed portions thereof were bonded and electrically connected using a "40 kHz-Ultrasonic Welding Machine" manufactured by Branson Ultrasonics Division of Emerson Japan Limited, thereby forming a connected body of the copper foil and the aluminum foil whose surface was not roughened.

An aluminum foil was cut from the sheet of an aluminum foil having a thickness of 100 µm which was formed with an aluminum oxide film on the surface thereof and whose surface was roughened so as to have a size of 1 cm×1.5 cm and was superposed on the aluminum foil whose surface was not roughened in such a manner that an end portion region thereof and the other end portion region of the aluminum foil whose surface was not roughened were overlapped by 1 mm. Then, the end portion regions overlapped with each other were bonded and electrically connected using the ultrasonic welding machine, thereby forming a connected body including the copper foil, the aluminum foil whose surface was not roughened and the aluminum foil which was formed with an aluminum oxide film on the surface thereof and whose surface was roughened bonded in this order.

Thus, an electrode body for a two-terminal type solid electrolytic capacitor including the copper foil, the aluminum foil whose surface was not roughened and the aluminum foil which was formed with an aluminum oxide film on the surface thereof and whose surface was roughened bonded in this order was fabricated.

The thus fabricated electrode body for a two-terminal type solid electrolytic capacitor was processed in the substantially same manner in Working Example 1 to fabricate a circuit board #3 having a built-in two-terminal type solid electrolytic capacitor.

Then, electrical characteristics of the thus fabricated circuit board #3 having a built-in two-terminal type solid electrolytic capacitor were estimated similarly to in Working Example 1.

The result was that the electrostatic capacitance of the circuit board sample #3 having a built-in solid electrolytic capacitor was at 120 Hz was 150 $\mu$F, the ESR value thereof at 100 kHz was 45 m$\Omega$ and the ESL value thereof at 100 kHz was 1500 pH.

Further, the circuit board sample #3 having a built-in solid electrolytic capacitor was held at a high temperature of 125° C. for 1000 hours and the electric characteristics thereof were estimated similarly to the above.

The result was that the electrostatic capacitance of the circuit board sample #3 having a built-in solid electrolytic capacitor was at 120 Hz was 140 $\mu$F, the ESR value thereof at 100 kHz was 55 m$\Omega$ and the ESL value thereof at 100 kHz was 1556 pH.

From Working Examples 1 and 2 and Comparative Example 1, it was found that each of the circuit board samples #1 and #2 each having a built-in solid electrolytic capacitor according to the present invention which uses the solid electrolytic capacitor fabricated by bonding the aluminum foil which was formed with an aluminum oxide film on the surface thereof and whose surface was roughened, the aluminum foil whose surface was not roughened and the copper foil had good electrostatic capacitance, ESR characteristic and ESL characteristic irrespective of how the foils were bonded, the material of electrical conductors and the kind of the solid high molecular polymer and that in the circuit board sample #3 having a built-in solid electrolytic capacitor according to Comparative Example 1, the ESR characteristic and ESL characteristic were poor and in particular, the ESL characteristic was extremely poor.

WORKING EXAMPLE 3

A discrete-type and three-terminal type solid electrolytic capacitor was fabricated in the following manner.

An aluminum foil was first cut from an aluminum foil sheet whose surface was roughened and which was formed with an aluminum oxide film on the surface thereof and had a thickness of 100 $\mu$m, so as to have a size of 0.7 cm$^2$. Further, two aluminum foils were cut from an aluminum foil sheet whose surface was not roughened and which had a thickness of 60 $\mu$m, so that each had the same width as that of the aluminum foil whose surface was roughened and a size of 0.2 cm$^2$.

Then, one of the aluminum foils whose surfaces were not roughened was superposed on the aluminum foil whose surface was roughened in such a manner that an end portion region thereof and one end portion region of the aluminum foil whose surface was not roughened were overlapped by 0.5 mm. Then, the end portion regions overlapped with each other were bonded and electrically connected using the ultrasonic welding machine, thereby fabricating a connected body of the aluminum foil whose surface was not roughened and the aluminum foil whose surface was roughened.

Further, the other aluminum foil whose surface was not roughened was superposed on the other end portion region of the aluminum foil whose surface was roughened in such a manner that end portion regions thereof were overlapped by 0.5 mm. Then, the end portion regions overlapped with each other were bonded and electrically connected using the ultrasonic welding machine, thereby fabricating a connected body of the aluminum foil whose surface was not roughened and the aluminum foil whose surface was roughened.

Thus, an electrode for a three-terminal type solid electrolytic capacitor component including the aluminum foil whose surface was not roughened, the aluminum foil whose surface was roughened and the aluminum foil whose surface was not roughened bonded in this order was fabricated.

Of the aluminum foils whose surface was not roughened formed at opposite end portions of the aluminum foil which was formed with the aluminum oxide film on the surface thereof and whose surface was roughened of the thus fabricated electrode body for a three-terminal type solid electrolytic capacitor component, only one end portion region of one of the aluminum foils whose surfaces were not roughened was coated with resist. However, no resist was applied to the other aluminum foil whose surface was not roughened.

Further, the thus fabricated electrode body was set in an aqueous solution of ammonium adipate prepared to have a concentration of 3% by weight, pH 6.0 so that the whole portion of the aluminum foil which was coated with the resist and whose surface was not roughened, the whole portion of the aluminum foil whose surface was roughened and which was formed with the aluminum oxide film on the surface thereof and a part of the other aluminum foil whose surface was not roughened were completely immersed therein as shown in FIG. 3.

An aluminum oxide film was then formed by connecting the aluminum foil of the electrode body, which was not coated with the resist and whose surface was not roughened to an anode, oxidizing the surface of the aluminum foil immersed in the aqueous solution of ammonium adipate under the condition that a forming current density was set at 50 to 100 mA/cm2 and a forming voltage was set equal to or lower than 12 volts.

Thereafter, the electrode body was extracted from the aqueous solution of ammonium adipate and a solid high molecular polymer electrolyte layer containing polypyrrol was formed by chemical oxidization polymerization on the surface of the aluminum foil of the anodic electrode which was roughened.

More specifically, the electrode body was set in a cell of a mixing solution of ethanol and water containing 0.1 mol/liter of pyrrol monomer purified by distillation, 0.1 mol/liter of alkylnaphthalene sodium sulfonate and 0.05 mol/liter of ferrous sulphate (III) so that only the aluminum foil whose surface was roughened and which was formed with the aluminum oxide film on the surface thereof was immersed therein and the solution was agitated for thirty minutes, thereby performing chemical oxidization polymerization. The same operation was repeated three times and as a result, a solid high molecular polymer electrolyte layer having a thickness of about 50 μm was formed.

Carbon paste was coated on the surface of the thus obtained solid high molecular polymer electrolyte layer and silver paste was further coated on the carbon paste, thereby forming a cathode electrode. After the paste layers were formed, the resist layer was dissolved with an organic solvent, thereby removing the resist layer and portions of the aluminum foil whose surface was not roughened and the copper foil were exposed. Thus, a three-terminal type solid electrolytic capacitor component was fabricated.

Four three-terminal type solid electrolytic capacitor components were fabricated by repeating the same operation.

Further, thus fabricated four three-terminal type solid electrolytic capacitor components were array-like mounted at predetermined positions on a lead frame processed so as to have a predetermined shape as shown in FIG. 6. A portion of the cathode electrode of the solid electrolytic capacitor component which was coated the paste layers was adhered onto the lead frame using a silver system adhesive agent. Portions of the two aluminum foils whose surfaces were not roughened was welded using a "YAG Laser Spot Welding Machine" manufactured by NEC Corporation and integrated with an anode electrode portion of the lead frame.

After the four solid electrolytic capacitor components were fixed onto the lead frame, they were molded with epoxy resin using an injection molding or a transfer molding.

The thus molded electrolytic capacitor components were removed from the lead frame and the anode lead electrode were folded, thereby fabricating a discrete type solid electrolytic capacitor sample #4. Then, a predetermined voltage current was supplied to the solid electrolytic capacitor sample #4 by a well known method, thereby conducting aging and sufficiently lowering a leak electrical current. Thus, the solid electrolytic capacitor sample #4 was completed.

Electrostatic capacitance and the $S_{12}$ characteristic of the thus fabricated solid electrolytic capacitor sample #4 were measured using an "Impedance Analyzer 4294A" and a "Net Work Analyzer 8753D" manufactured by Agilient Technologies. Then, equivalent circuit simulation was performed based on the thus measured $S_{12}$ characteristic, thereby determining an ESR value and an ESL value.

WORKING EXAMPLE 4

A circuit board having a built-in three-terminal type solid electrolytic capacitor (hereinafter sometimes referred to as a "three-terminal type solid electrolytic capacitor" or simply referred to as a "solid electrolytic capacitor") was fabricated in the following manner.

A copper foil was first cut from a copper foil sheet so as to have a size of 0.1 cm$^2$ and thickness of 60 μm and an aluminum foil whose surface was not roughened was cut from an aluminum foil sheet so as to have the same width as that of the copper foil, a size of 0.2 cm$^2$ and thickness of 60 μg/m. Then, they were superposed in such a manner that end portion regions thereof were overlapped by 2.0 mm and the end portion regions overlapped with each other were bonded and electrically connected using the ultrasonic welding machine, whereby a connected body of the copper foil and the aluminum foil whose surface was not roughened was fabricated. Thus, two connected bodies were fabricated.

Then, an aluminum foil was cut from an aluminum foil sheet whose surface was roughened and which was formed with an aluminum oxide film on the surface thereof and had a thickness of 60 μm, so as to have a size of 0.7 cm$^2$ and the thus cut aluminum foil was superposed on the connected body of the copper foil and the aluminum foil whose surface was not roughened in such a manner that the end portion regions thereof were overlapped by 0.5 mm. Then, the end portion regions overlapped with each other were bonded and electrically connected using the ultrasonic welding machine, thereby fabricating a connected body of the copper foil, the aluminum foil whose surface was not roughened and the aluminum foil whose surface was roughened.

Further, the other connected body of the copper foil and the aluminum foil whose surface was not roughened was superposed on the other end portion region of the aluminum foil whose surface was roughened in such a manner that the end portion regions thereof were overlapped by 0.5 mm. Then, the end portion regions overlapped with each other were bonded and electrically connected using the ultrasonic welding machine, thereby fabricating a connected body of the copper foil, the aluminum foil whose surface was not roughened, the aluminum foil whose surface was roughened, the aluminum foil whose surface was not roughened and the copper foil.

Thus, an electrode for a three-terminal type solid electrolytic capacitor component including the copper foil, the aluminum foil whose surface was not roughened, the aluminum foil whose surface was roughened, the aluminum foil whose surface was not roughened and the copper foil bonded in this order was fabricated.

Of the copper foil and the aluminum foil whose surface was not roughened formed at opposite end portions of the aluminum foil which was formed with the aluminum oxide film on the surface thereof and whose surface was roughened of the thus fabricated electrode body for a three-terminal type solid electrolytic capacitor component, only one end portion region thereof was coated with resist. However, no resist was applied to the other connected body.

Further, the thus fabricated electrode body was set in an aqueous solution of ammonium adipate prepared to have a concentration of 3% by weight, pH 6.0 so that the whole portions of the copper foil and the aluminum foil which was coated with the resist and whose surface was not roughened, the whole portion of the aluminum foil whose surface was roughened and which was formed with the aluminum oxide film on the surface thereof and a part of the other aluminum foil whose surface was not roughened was completely immersed therein. At this time, a part of the aluminum foil whose surface was not roughened was immersed in the aqueous solution of ammonium adipate but the copper foil was not brought into contact with the aqueous solution of ammonium adipate.

An aluminum oxide film was then formed by connecting the copper foil of the electrode body, which was not coated with the resist to an anode, oxidizing the surface of the aluminum foil immersed in the aqueous solution of ammonium adipate under the condition that a forming current density was set at 50 to 100 mA/cm2 and a forming voltage was set equal to or lower than 12 volts.

Thereafter, the electrode body was extracted from the aqueous solution of ammonium adipate and a solid high molecular polymer electrolyte layer containing polypyrrol was formed by chemical oxidization polymerization on the surface of the aluminum foil whose surface was roughened.

More specifically, the electrode body was set in a cell of a mixing solution of ethanol and water containing 0.1 mol/liter of pyrrol monomer purified by distillation, 0.1 mol/liter of alkylnaphthalene sodium sulfonate and 0.05 mol/liter of ferrous sulphate (III) so that only the aluminum foil whose surface was roughened and which is formed with the aluminum oxide film on the surface thereof was immersed therein and the solution was agitated for thirty minutes, thereby performing chemical oxidization polymerization. The same operation was repeated three times and as a result, a solid high molecular polymer electrolyte layer having a thickness of about 50 $\mu$m was formed.

Carbon paste was coated on the surface of the thus obtained solid high molecular polymer electrolyte layer and silver paste was further coated on the carbon paste, thereby forming a cathode electrode. After the paste layers were formed, the resist layer was dissolved with an organic solvent, thereby removing the resist layer and portions of the aluminum foil whose surface was not roughened and the copper foil were exposed. Thus, a three-terminal type solid electrolytic capacitor component was fabricated.

Four three-terminal type solid electrolytic capacitor components were fabricated by repeating the same operation.

On the other hand, two epoxy resin insulating substrates each having copper foils having a thickness of 18 $\mu$m and adhered to the opposite surfaces thereof, a thickness of 0.5 mm and a size of 143 cm×46 cm and containing glass cloth were prepared in the following manner.

A part of copper foil was removed by a chemical etching process from the copper foil surface for forming an electrical circuit and a predetermined wiring pattern was formed. However, the surface of the substrate on which a solid electrolytic capacitor was to be mounted was patterned with resist and subjected to chemical etching for a predetermined patterning, thereby removing copper foil from portions where copper foil was not needed to be present so that the four solid electrolytic capacitor components could be disposed to be spaced by a predetermined interval and the cathode electrodes thereof could be electrically connected to each other.

Further, through-holes were formed in one of the glass cloth containing epoxy resin insulating substrates at positions corresponding to two anode lead electrodes and cathode electrodes of a solid electrolytic capacitor to be built in. Then, a nickel plating layer having a thickness of 3 $\mu$m was formed using the electroless nickel plating process on the through-holes and copper patterns and a gold plating layer having a thickness of 0.08 $\mu$m was further formed on the nickel plating layer.

Similarly, through-holes used for electronic devices to be mounted were formed in the other glass cloth containing epoxy resin insulating substrate.

On the other hand, a substrate formed of glass cloth containing epoxy resin and having a thickness of 200 $\mu$m was fabricated so as to have a size of 143 mm×46 mm and the inner region thereof was punched out so that a region having a width of 3 mm remained, thereby fabricating the substrate for a bank.

Further, two epoxy pre-pregs each formed of glass cloth containing epoxy resin and having a thickness of 50 $\mu$m were fabricated so that each had a size of 143 mm×46 mm and the inner region of each epoxy pre-preg was punched out so that a region having a width of 3 mm remained, thereby fabricating two substrates for banks.

The substrate for a bank fabricated by removing the inner region thereof by punch out and the surface of the glass cloth containing epoxy resin insulating substrate formed with wiring patterns so that the solid electrolytic capacitor could be mounted thereon were brought into close contact with each other via one of the thus processed epoxy pre-pregs having the thickness of 50 $\mu$m and maintained using a vacuum hot press apparatus at 175° C. under pressure and then under a reduced pressure for 40 minutes, thereby curing the epoxy pre-preg and the glass cloth containing epoxy resin insulating substrate and the substrate whose inner region was removed were fixed. Thus, an insulating substrate having a concave space was fabricated.

The four three-terminal type solid electrolytic capacitor components were fixed using a silver-epoxy system adhesive agent onto the surface of the insulating substrate formed with wiring patterns so that the solid electrolytic capacitor could be mounted thereon, whereby the two anode lead electrodes and the cathode electrode of the three-terminal type solid electrolytic capacitor component were disposed at positions corresponding to the through-holes formed in the insulating substrate.

Then, the other glass cloth containing epoxy resin insulating substrate was superposed on and brought into close contact with the glass cloth containing epoxy resin insulating substrate which has the concave space and onto which the three-terminal type solid electrolytic capacitor components were fixed via the other epoxy pre-preg having the thickness of 50 $\mu$m fabricated in the above described manner so that the solid electrolytic capacitor components were accommodated within the concave space.

The thus contacted glass cloth containing epoxy resin insulating substrates were maintained using the vacuum hot press apparatus at 175° C. under pressure and then under a reduced pressure for 40 minutes, thereby curing the epoxy pre-preg and the two glass cloth containing epoxy resin insulating substrates were fixed to each other.

After the glass cloth containing epoxy resin insulating substrates were cooled, portions of the through-holes formed in the glass cloth containing epoxy resin insulating substrates and the wiring patterns formed on the surfaces of the glass cloth containing epoxy resin insulating substrates were electrically connected using a conductive adhesive agent, solder or the like, whereby a circuit board sample #5 having a built-in solid electrolytic capacitor was obtained. Thereafter, aging was conducted in a well-known manner by applying a predetermined voltage to an anode lead terminal and a cathode lead terminal so as to sufficiently lower leakage current, thereby completing the circuit board sample #5 having a built-in solid electrolytic capacitor.

Electrical characteristics of the thus fabricated circuit board sample #5 having a built-in solid electrolytic capacitor were estimated similarly to in Working Example 1.

COMPARATIVE EXAMPLE 2

A circuit board having a built-in two-terminal type solid electrolytic capacitor (hereinafter sometimes referred to as a "two-terminal type solid electrolytic capacitor" or simply referred to as a "solid electrolytic capacitor") was fabricated in the following manner.

A copper foil was first cut from a copper foil sheet so as to have a size of 0.1 cm$^2$ and thickness of 60 $\mu$m and an aluminum foil whose surface was not roughened was cut from an aluminum foil sheet so as to have the same width as that of the copper foil, a size of 0.2 cm$^2$ and thickness of 60 $\mu$m. Then, they were superposed in such a manner that end portion regions thereof were overlapped by 2.0 mm and the end portion regions overlapped with each other were bonded and electrically connected using the ultrasonic welding machine, whereby a connected body of the copper foil and the aluminum foil whose surface was not roughened was fabricated. Thus, two connected bodies were fabricated.

Then, an aluminum foil was cut from an aluminum foil sheet whose surface was roughened and which was formed with an aluminum oxide film on the surface thereof and had a thickness of 60 μm so as to have a size of 0.7 cm² and the thus cut aluminum foil was superposed on the connected body of he copper foil and the aluminum foil whose surface was not roughened in such a manner that the end portion regions thereof were overlapped by 0.5 mm. Then, the end portion regions overlapped with each other were bonded and electrically connected using the ultrasonic welding machine, thereby fabricating a connected body of the copper foil, the aluminum foil whose surface was not roughened and the aluminum foil whose surface was roughened.

Thus, an electrode for a two-terminal type solid electrolytic capacitor component including the copper foil, the aluminum foil whose surface was not roughened and the aluminum foil whose surface was roughened bonded in this order was fabricated.

A two-terminal type solid electrolytic capacitor component was fabricated using the thus fabricated electrode for a two-terminal type solid electrolytic capacitor component by forming a solid high molecular polymer electrolyte layer and paste layers in the substantially same manner as in Working Example 2 and the two-terminal type solid electrolytic capacitor component was accommodated between the two glass cloth containing epoxy resin insulating substrates, thereby fabricating a circuit board sample #6 having a built-in two-terminal type solid electrolytic capacitor. Thereafter, aging was conducted in a well-known manner by applying a predetermined voltage to the solid electrolytic capacitor so as to sufficiently lower leakage current, thereby completing the circuit board sample #6 having a built-in solid electrolytic capacitor.

Electrical characteristics of the thus fabricated circuit board sample #6 having a built-in solid electrolytic capacitor were estimated similarly to in Working Example 1.

The results of the estimation of electrical characteristic of the solid electrolytic capacitor samples #4 to #6 are shown in Table 1. In Table 1, No. 1 to No. 4 respectively indicate the array-like disposed four solid electrolytic capacitor components.

TABLE 1

| | ELECTROSTATIC CAPACITANCE (μF) | | | ESR (mΩ) | | | ESL (pH) | | |
|---|---|---|---|---|---|---|---|---|---|
| | #4 | #5 | #6 | #4 | #5 | #6 | #4 | #5 | #6 |
| No. 1 | 95 | 100 | 100 | 20 | 18 | 28 | 18 | 20 | 1250 |
| No. 2 | 90 | 85 | 85 | 15 | 13 | 25 | 12 | 10 | 1280 |
| No. 3 | 97 | 87 | 87 | 23 | 15 | 30 | 14 | 14 | 1230 |
| No. 4 | 90 | 90 | 90 | 18 | 11 | 35 | 12 | 12 | 1310 |

As shown in Table 1, it was found that the solid electrolytic capacitor samples #4 and #5 according to the present invention, each of which was obtained by array-like disposing the three-terminal type solid electrolytic capacitor components each fabricated by bonding the aluminum foil whose surface was roughened and which was formed with the aluminum oxide film on the surface thereof, the aluminum foil whose surface was not roughened and the copper foil, and electrically connecting the cathode electrodes had good electrostatic capacitance, ESR characteristic and ESL characteristic irrespective of whether the discrete type or the built-in type, how the foils were bonded, the material of electrical conductors and the kind of the solid high molecular polymer and that in the two-terminal type solid electrolytic capacitor sample #6 according to Comparative Example 1, the ESR characteristic and ESL characteristic were poor and in particular, the ESL characteristic was extremely poor.

Further, each sample of the three-terminal type solid electrolytic capacitors, the circuit boards having built-in three-terminal type solid electrolytic capacitors and the circuit boards having built-in two-terminal type solid electrolytic capacitors were held at the constant temperature of 125° C. for 1000 hours and the electric characteristics thereof were measured similarly to the above.

The results of the measurement of the electrical characteristics of the solid electrolytic capacitor samples #4 to #6 are shown in Table 2.

TABLE 2

| | ELECTROSTATIC CAPACITANCE (μF) | | | ESR (mΩ) | | | ESL (pH) | | |
|---|---|---|---|---|---|---|---|---|---|
| | #4 | #5 | #6 | #4 | #5 | #6 | #4 | #5 | #6 |
| No. 1 | 95 | 93 | 90 | 18 | 21 | 32 | 17 | 16 | 1260 |
| No. 2 | 91 | 89 | 82 | 14 | 15 | 30 | 13 | 10 | 1285 |
| No. 3 | 96 | 92 | 81 | 16 | 25 | 30 | 15 | 18 | 1236 |
| No. 4 | 91 | 88 | 89 | 15 | 20 | 37 | 12 | 21 | 1340 |

As shown in Table 2, it was found that even when the samples were held at the constant temperature of 125° C. for 1000 hours, substantially the same results as those shown in Table 1 were obtained.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, although the aluminum substrate is used as the valve metal substrate 2, 3, the valve metal substrate 2, 3 may be formed of aluminum alloy, or tantalum, titanium, niobium, zirconium or alloy thereof instead of aluminum.

Moreover, in the above described embodiments, although the foil-like copper substrate is used as a metal conductor for constituting a lead electrode, the metal conductor may be formed of copper alloy, or brass, nickel, zinc, chromium or alloy thereof instead of copper.

Further, in the above described embodiment, the foil-like aluminum substrate 2 whose surface is roughened and the foil-like aluminum substrate 3a, 3b whose surface is not roughened are connected by ultrasonic welding and the foil-like aluminum substrate 3a, 3b whose surface is not roughened and the foil-like copper substrate 4a, 4b are connected by ultrasonic welding. However, both connected portions or one of them may be formed by cold welding instead of ultrasonic welding.

Furthermore, in the above described embodiments, although the surface of the foil-like aluminum substrate 2 is roughened so as to increase the specific surface thereof, it is not absolutely necessary in the present invention for the surface of the foil-like aluminum substrate 2 to be roughened.

Moreover, in the above described embodiments, although the foil-like aluminum substrate 3a, 3b whose surface is not roughened is bonded to the foil-like aluminum substrate 2 whose surface is roughened, it is not absolutely necessary in the present invention for the aluminum substrates to be foil-like and each of the aluminum substrates may be a frame-like or block-like substrate having a larger thickness, for example. Further, it is not absolutely necessary for the copper substrates to be foil-like and each of the copper substrates may be frame-like or block-like.

Furthermore, in the embodiment shown in FIG. 5, although the solid electrolytic capacitor 10 is held between the first insulating substrate 21 and the second insulating substrate 22, thereby fabricating the circuit board 20 having a built-in solid electrolytic capacitor, a circuit board 20 having a built-in solid electrolytic capacitor can be fabricated by fixing a solid electrolytic capacitor 10 on one insulating substrate.

Further, in the embodiment shown in FIG. 5, although the plurality of electronic devices are mounted on both surfaces of the first insulating substrate 21 and the second insulating substrate 22, it is not absolutely necessary to mount a plurality of electronic devices.

Moreover, in the embodiment shown in FIG. 5, although the electronic devices are mounted on both surfaces of the first insulating substrate 21 and the second insulating substrate 22, it is possible to mount electronic devices on one of surfaces of the first insulating substrate 21 and the second insulating substrate 22.

Further, in the embodiment shown in FIG. 5, although a plurality of wiring patterns 24, 27 are formed on the surfaces of the first insulating substrate 21 and the second insulating substrate 22, it is not absolutely necessary to form a plurality of wiring patterns 24, 27 on the surfaces of the first insulating substrate 21 and the second insulating substrate 22 and it is possible to form at least one wiring pattern thereon.

Furthermore, in the embodiment shown in FIG. 5, although a plurality of through-holes 28 are formed in the first insulating substrate 21 and the second insulating substrate 22, it is not absolutely necessary to form a plurality of through-holes 28 in the first insulating substrate 21 and the second insulating substrate 22 and it is possible to form at least one through-hole therein.

Moreover, in the embodiment shown in FIG. 5, although the bank 23 is formed on the first insulating substrate 21, it is possible to form a bank 23 on the second insulating substrate 22.

Further, in the embodiment shown in FIG. 5, the bank 23 is formed by punching out a substrate made of the same material as that used for forming the first insulating substrate 21 and the second insulating substrate 22 so that a portion having a predetermined area remains at the peripheral portion of the substrate to form and fixing the frame-like substrate onto the first insulating substrate 21 using an adhesive agent of the same material as that used for forming the first insulating substrate 21 and the second insulating substrate 22. However, a bank can be integrally formed with the first insulating substrate 21 by cutting the first insulating substrate 21, and banks can be integrally formed with the first insulating substrate 21 and the second insulating substrate 22 by cutting the first insulating substrate 21 and the second insulating substrate 22.

Furthermore, in the embodiment shown in FIG. 5, although the bank 23 is formed on the first insulating substrate 21 along the opposite side portions thereof so as to have height larger than the thickness of the solid electrolytic capacitor 10, it is not absolutely necessary to form a bank 23 and a spacer can be used instead of a bank 23. Further, it is possible to integrate the first insulating substrate 21 and the second insulating substrate 22 so as to be spaced apart via the solid electrolytic capacitor 10 only by using resin.

Moreover, in the embodiment shown in FIG. 5, although the solid electrolytic capacitor component 110 is held between the first insulating substrate 21 and the second insulating substrate 22, thereby fabricating the printed board 120 having a built-in solid electrolytic capacitor, it is possible to fabricate a printed board on which a solid electrolytic capacitor is mounted by fixing a solid electrolytic capacitor component 110 on one insulating substrate.

According to the present invention, it is possible to provide a three-terminal type solid electrolytic capacitor constituted by sequentially forming a solid high molecular polymer electrolyte layer and a conductive layer on a foil-like valve metal substrate whose surface is roughened and which is formed with an insulating oxide film on the surface thereof and suitable for being built in a circuit board, a circuit board having a built-in three-terminal type solid electrolytic capacitor and methods for manufacturing them.

What is claimed is:

1. A solid electrolytic capacitor comprising:
   at least one solid electrolytic capacitor component comprising a foil-like valve metal substrate formed with an insulating oxide film on the surface thereof, a valve metal body whose one end portion region is bonded to one end portion region of opposite end portion regions of the foil-like valve metal substrate so that electric connection can be established between valve metals;
   a conductive metal substrate whose one end portion region is bonded to the other end portion region of the opposite end portion regions of the foil-like valve metal substrate so that electric connection can be established between metals;
   and an anode electrode formed by sequentially forming at least a solid high molecular polymer electrolyte layer and a conductive layer on the foil-like valve metal substrate.

2. A solid electrolytic capacitor in accordance with claim 1 wherein a plurality of solid electrolytic capacitor components are disposed independent of each other on a lead frame, conductive layers each provided in one of the solid electrolytic capacitor components are electrically connected with each other by the lead frame and a part of a cathode lead electrode is drawn out from one surface of a region where the lead frame and the conductive layers of the solid electrolytic capacitor components intersect with each other in a direction perpendicular to the one surface of the region.

3. A circuit board having a built-in solid electrolytic capacitor comprising:
   at least one solid electrolytic capacitor component having a foil-like valve metal substrate, a valve metal body whose one end portion region is bonded to each of one opposite end portion regions of the foil-like valve metal substrate so that electrical connection can be established between the valve metals;
   a conductive metal substrate whose one end portion region is bonded to the other end portion region of the foil-like valve metal substrate so that electrical connection can be established between the metals and a cathode electrode formed by sequentially forming at least a solid high molecular polymer electrolyte layer and a conductive layer on the foil-like valve metal substrate;
   the at least one solid electrolytic capacitor component being mounted on one surface of a first insulating substrate formed with at least one wiring pattern so as to electrically connect with the wiring pattern and being accommodated within a substantially closed space defined by the first insulating substrate;

and a second insulating substrate facing the first insulating substrate and formed with at least one wiring pattern.

4. A circuit board having a built-in solid electrolytic capacitor in accordance with claim 3, wherein a plurality of solid electrolytic capacitor components are disposed independent of each other on the first insulating substrate, conductive layers each provided in one of the solid electrolytic capacitor components are electrically connected with each other by the corresponding wiring pattern and a part of the wiring pattern is drawn out from one surface of a region where the wiring pattern and the conductive layers of the solid electrolytic capacitor components intersect with each other in a direction perpendicular to the one surface of the region so as to pass through the first insulating substrate.

5. A method for manufacturing a solid electrolytic capacitor comprising steps of:

bonding one end portion region of a valve metal body to one of two opposite end portion regions of a foil-like valve metal substrate formed with an insulating oxide film so that electric connection can be established between the valve metals;

bonding one end portion region of a conductive metal substrate to the other end portion region so that electric connection can be established between the metals to fabricate an electrode body for a solid electrolytic capacitor component;

masking, of the whole electrode body, a part of the valve metal body and the entire conductive metal substrate bonded to the valve metal body;

dipping, of the whole electrode body, the whole foil-like valve metal substrate, the entire masked portion and a part of the valve metal body which is not masked in a forming solution, applying voltage to the electrode body to effect anodic oxidization thereon and form an insulating oxide film at least at an edge portion of the foil-like valve metal substrate;

forming a solid high molecular polymer electrolyte layer on the substantially entire surface of the foil-like valve metal substrate;

and coating the solid high molecular polymer electrolyte layer with the conductive paste and drying the conductive paste to form a conductive layer.

6. A method for manufacturing a circuit board having a built-in solid electrolytic capacitor comprising steps of:

bonding one end portion region of a valve metal body to one of two opposite end portion regions of a foil-like valve metal substrate formed with an insulating oxide film so that electric connection can be established between the valve metals;

bonding one end portion region of a conductive metal substrate to the other end portion region so that electric connection can be established between the metals to fabricate an electrode body for a solid electrolytic capacitor component;

masking, of the whole electrode body, a part of the valve metal body and the entire conductive metal substrate bonded to the valve metal body;

dipping, of the whole electrode body, the whole foil-like valve metal substrate, the entire masked portion and a part of the valve metal body which is not masked in a forming solution, applying voltage to the electrode body to effect anodic oxidization thereon and form an insulating oxide film at least at an edge portion of the foil-like valve metal substrate;

forming a solid high molecular polymer electrolyte layer on the substantially entire surface of the foil-like valve metal substrate;

coating the solid high molecular polymer electrolyte layer with the conductive paste and drying the conductive paste to form a conductive layer;

mounting at least one solid electrolytic capacitor thus fabricated on one surface of a first insulating substrate formed with at least one wiring pattern so as to electrically connect with the wiring pattern;

and accommodating the solid electrolytic capacitor within a substantially closed space defined by the first insulating substrate and a second insulating substrate facing the first insulating substrate and formed with at least one wiring pattern.

\* \* \* \* \*